(12) United States Patent
Ridgway et al.

(10) Patent No.: US 6,687,425 B2
(45) Date of Patent: Feb. 3, 2004

(54) WAVEGUIDES AND DEVICES INCORPORATING OPTICALLY FUNCTIONAL CLADDING REGIONS

(75) Inventors: Richard William Ridgway, Westerville, OH (US); Van Earl Wood, Delaware, OH (US); David William Nippa, Dublin, OH (US)

(73) Assignee: Battelle Memorial Institute, Columbus, OH (US)

(*) Notice: Subject to any disclaimer, the term of this patent is extended or adjusted under 35 U.S.C. 154(b) by 41 days.

(21) Appl. No.: 09/916,238

(22) Filed: Jul. 26, 2001

(65) Prior Publication Data

US 2003/0059189 A1 Mar. 27, 2003

(51) Int. Cl.[7] ............................. G02B 6/12; G02B 6/10
(52) U.S. Cl. ..................... 385/14; 385/129; 385/130; 385/132
(58) Field of Search ..................... 385/11, 14, 40, 385/123, 129, 130, 131, 132

(56) References Cited

U.S. PATENT DOCUMENTS

| | | | |
|---|---|---|---|
| 3,558,213 A | 1/1971 | Marcatili | 385/132 |
| 3,589,794 A | 6/1971 | Marcatili | 385/142 |

(List continued on next page.)

FOREIGN PATENT DOCUMENTS

| | | |
|---|---|---|
| WO | WO 00/28355 | 5/2000 |

OTHER PUBLICATIONS

H F Schlaak, Modulation Behaviour of Integrated Optical Directional Couplers, Journal of Optical Communications, 1984, 122–131.

E A J Marcatili, Dielectric Rectangular Waveguide and Directional Coupler for Integrated Optics, Bell Syst. Tech. J., vol. 48, pp. 20–111, Sep. 1969.

C Themistos, B M Azizur Rahman, Kenneth T V Grattan, Design Considerations for an Electrooptic Directional Coupler Modulator, Journal of Lightwave Technology, vol. 17, No. Apr. 1999.

Arkady Kaplan, Shlomo Ruschin; Layout For Polarization Insensitive Modulation In LiNbO3 Waveguides; IEEE Journal of Selected Topics in Quantum Electronics; Jan. 2000; pp. 83–87; vol. 6, No. 1; IEEE; Israel.

*Primary Examiner*—Loha Ben
*Assistant Examiner*—William Choi
(74) *Attorney, Agent, or Firm*—Killworth, Gottman, Hagan & Schaeff LLP

(57) ABSTRACT

Waveguides and integrated optical devices incorporating optically functional cladding regions are provided. In accordance with one embodiment of the present invention, an electrooptic clad waveguide is provided with an optical waveguide core and first and second electrooptic cladding regions. The optical waveguide core is a substantially non-electrooptic material. The cladding regions are electrooptic polymers defining a refractive index that is less than that of the core. The first and second cladding regions may be poled in opposite or perpendicular directions or along a contour of an electric field. Additional embodiments of the present invention utilize other types of optically functional materials in the cladding regions. Integrated optical devices according to the present invention comprise phase modulators, intensity modulators, 2×2 polarization independent optical switches, high-frequency modulators, wavelength-dependent optical switches, directional couplers employing electrooptic gaps and electrooptic cladding regions, and optical devices with thinned-down waveguide channels and phase compensating elements.

60 Claims, 10 Drawing Sheets

U.S. PATENT DOCUMENTS

| | | | |
|---|---|---|---|
| 3,850,503 A | 11/1974 | Riseberg et al. ............... 385/41 |
| 4,070,094 A | 1/1978 | Martin ........................... 385/8 |
| 4,730,171 A | 3/1988 | So et al. ...................... 359/245 |
| 4,737,014 A | 4/1988 | Green ......................... 385/123 |
| 4,884,858 A | 12/1989 | Ushikubo et al. .............. 385/16 |
| 4,936,645 A | 6/1990 | Yoon et al. ..................... 385/2 |
| 5,045,364 A | 9/1991 | Fang ....................... 428/411.1 |
| 5,533,151 A | 7/1996 | Leonard ......................... 385/3 |
| 5,546,480 A | 8/1996 | Leonard ......................... 385/3 |
| 5,581,642 A | 12/1996 | Deacon et al. ................ 385/15 |
| 5,659,010 A | 8/1997 | Sotoyama et al. .......... 528/353 |
| 5,703,710 A | 12/1997 | Brinkman et al. .......... 359/283 |
| 5,732,177 A | 3/1998 | Deacon et al. .............. 385/122 |
| 5,818,983 A | 10/1998 | Yoshimura et al. ........... 385/14 |
| 5,825,525 A | 10/1998 | Harwit ....................... 359/248 |
| 5,854,866 A | 12/1998 | Leonard ...................... 385/39 |
| 5,857,039 A | 1/1999 | Bosc et al. .................... 385/14 |
| 5,862,276 A | 1/1999 | Karras ......................... 385/30 |
| 5,887,089 A | 3/1999 | Deacon et al. ................ 385/22 |
| 5,970,186 A | 10/1999 | Kenney et al. ................ 385/16 |
| 6,022,671 A | 2/2000 | Binkley et al. ............. 430/321 |
| 6,137,619 A | 10/2000 | Chen et al. .................. 359/251 |
| 6,144,779 A | 11/2000 | Binkley et al. ................. 385/8 |
| 6,167,169 A | 12/2000 | Brinkman et al. .............. 385/4 |
| 6,195,479 B1 | 2/2001 | Pan ............................. 385/18 |
| 6,507,681 B1 * | 1/2003 | Kowalczyk et al. ........... 385/16 |

* cited by examiner

WAVEGUIDES AND DEVICES INCORPORATING OPTICALLY FUNCTIONAL CLADDING REGIONS

CROSS-REFERENCE TO RELATED APPLICATIONS

The present application is related to U.S. patent application Ser. No. 09/777,439, filed Feb. 6, 2001, entitled FUNCTIONAL MATERIALS FOR USE IN OPTICAL SYSTEMS.

BACKGROUND OF THE INVENTION

The present invention relates to optical signal transmission and, more specifically, an improved optical waveguide useful in applications requiring modulation and switching of optical signals.

It is becoming increasingly important to frequently upgrade telecommunication networks to increase their capacity due to the recent rapid increase in network traffic caused by multimedia communications. Although optical technologies are replacing most transmission lines, the nodes of optical networks, such as switching and cross-connect nodes, still depend on relatively slow electrical technologies. Specifically, time-division multiplexing (TDM) systems are widely used in existing optical communications systems and are inherently dependent on electrical circuits for multiplexing and demultiplexing. As a result, the electrical nodes in these types of optical networks limit throughput.

Accordingly, there is a need in the art for advances in telecommunication network design. More specifically, there is a need for innovation in the areas of switching, modulation, multiplexing and demultiplexing via optical technologies.

BRIEF SUMMARY OF THE INVENTION

This need is met by the present invention wherein waveguides and integrated optical devices incorporating optically functional cladding regions are provided. A significant advantage of many embodiments of the present invention lies in the use of two or more electrooptic cladding regions that are, through appropriate poling and/or deposition procedures, oriented with their polar axes in different directions. This type of orientation and variations thereof, as described herein, allow for production of waveguides and integrated optical devices exhibiting unique functionality and allowing for optimum flexibility in device design. The waveguides and integrated optical devices described herein may be exploited in various ways, many of which are described herein.

In accordance with one embodiment of the present invention, an electrooptic clad waveguide is provided comprising an optical waveguide core and first and second cladding regions. The optical waveguide core defines a primary axis of propagation z. The first cladding region is offset from the z axis in a first direction along an x axis perpendicular to the z axis. The second cladding region is offset from the z axis in a second direction along the x axis. The optical waveguide core comprises a substantially non-electrooptic material defining a refractive index $n_1$ and the first and second cladding regions comprises an electrooptic polymer defining a refractive index that is less than $n_1$. The first and second cladding regions may be poled in opposite or perpendicular directions.

In accordance with another embodiment of the present invention, an electrooptic clad waveguide is provided where first and second control electrodes are arranged to enable electrooptic modification of the refractive indices of the first and second cladding regions by creating a contoured electric field in the first and second cladding regions. The contoured electric field and the respective directions of polarization in the first and second cladding regions define a polarization-independent waveguide structure along the primary axis of propagation of the electrooptic clad waveguide. Preferably, the first and second cladding regions are poled along substantially the same contour of the electric field.

In accordance with yet another embodiment of the present invention, an integrated optical device is provided comprising an optical input, an optical output, an electrooptic clad waveguide, and first and second control electrodes. The electrooptic clad waveguide is arranged along an optical path defined between the optical input and the optical output. The electrooptic clad waveguide is characterized by an optical phase delay $\phi = 2\pi L n_{eff}/\lambda$, where $n_{eff}$ is the effective index of refraction of the waveguide, L is the length over which the phase delay occurs, and $\lambda$ is the wavelength of light propagating along the optical path. The electrooptic clad waveguide comprises an optical waveguide core defining a primary axis of propagation z, a first cladding region offset from the z axis in a first direction along an x axis perpendicular to the z axis, and a second cladding region offset from the z axis in a second direction along the x axis. The optical waveguide core comprises a substantially non-electrooptic material defining a refractive index $n_1$. The first and second cladding regions comprise an electrooptic polymer defining a refractive index that is less than $n_1$. The waveguide core defines a cross-sectional x axis width that decreases from a region outside of the first and second cladding regions to a region bounded by the first and second cladding regions. The first and second control electrodes are arranged to create an electric field in the first and second cladding regions capable of changing the refractive indices of the first and second electrooptic cladding regions without a corresponding change in the refractive index $n_1$ of the waveguide core so as to induce a core-independent change in $n_{eff}$ and a corresponding change in the optical phase delay $\phi$ of the waveguide.

In accordance with yet another embodiment of the present invention, an integrated optical device is provided where first and second waveguides are arranged to define a Mach-Zehnder interferometer. The interferometer includes first and second directional coupling regions, an intermediate coupling region disposed between the first and second directional coupling regions, a set of control electrodes, an optical input, and at least one optical output. One or both of the first and second waveguides comprise an electrooptic clad waveguide comprising a substantially non-electrooptic optical waveguide core defining a refractive index $n_1$. The waveguide core of the electrooptic clad waveguide is disposed between first and second cladding regions in the intermediate coupling region. The first and second cladding regions comprise a poled electrooptic polymer defining a refractive index that is less than $n_1$. The control electrodes are arranged to create an electric field in the first and second cladding regions capable of changing the refractive indices of the first and second electrooptic cladding regions so as to induce a change in an effective index of refraction $n_{eff}$ of the electrooptic clad waveguide. The control electrodes are further arranged so that a quantitative combination of the electric field and the poling in the first cladding region is substantially equivalent to a quantitative combination of the electric field and the poling in the second cladding region. In this manner an output intensity $I_{out}$ at one of the optical outputs is related to an input intensity $I_{in}$ according to one of the following equations $$|I_{out}|^2 = |I_{in}|^2 \sin^2\left(\frac{\phi}{2}\right)$$

$$|I_{out}|^2 = |I_{in}|^2 \cos^2\left(\frac{\phi}{2}\right)$$

where $\phi$ represents optical phase delay resulting from the change in the effective index of refraction $n_{eff}$ of the electrooptic clad waveguide.

In accordance with yet another embodiment of the present invention, an integrated optical device is provided comprising first and second electrooptic clad waveguides arranged to define a Mach-Zehnder interferometer. The interferometer includes first and second directional coupling regions, an intermediate coupling region disposed between the first and second directional coupling regions, a set of control electrodes, first and second optical inputs, and first and second optical outputs. The waveguide core of the first waveguide is disposed between first and second cladding regions of the first waveguide in the intermediate coupling region. The waveguide core of the second waveguide is disposed between first and second cladding regions of the second waveguide in the intermediate coupling region. The poling of the first and second cladding regions of the first waveguide is substantially perpendicular to the poling of the first and second cladding regions of the second waveguide. The control electrodes are arranged to create an electric field in the first and second cladding regions of the first and second waveguides to induce a change in an effective index of refraction $n_{eff}$ of the first and second waveguides, whereby input optical signals may be directed selectively to separate ones of the optical outputs by controlling the electric field.

In accordance with yet another embodiment of the present invention, an integrated optical device is provided comprising first and second waveguides arranged to define a Mach-Zehnder interferometer. The control electrodes of the device form a traveling wave stripline and are arranged to create an electric field in the first and second cladding regions capable of changing the refractive indices of the first and second electrooptic cladding regions so as to induce a change in an effective index of refraction $n_{eff}$ of the electrooptic clad waveguide. The traveling wave stripline is characterized by a dielectric constant $\epsilon$ selected such that an optical signal propagating in the electrooptic clad waveguide propagates at the same velocity as an electrical signal propagating in the traveling wave stripline. The control electrodes are arranged such that a quantitative combination of the electric field and the poling in the first cladding region is substantially equivalent to a quantitative combination of the electric field and the poling in the second cladding region, whereby an output intensity $I_{out}$ at one of the optical outputs is related to an input intensity $I_{in}$ according to one of the following equations $$|I_{out}|^2 = |I_{in}|^2 \sin^2\left(\frac{\phi}{2}\right)$$

$$|I_{out}|^2 = |I_{in}|^2 \cos^2\left(\frac{\phi}{2}\right)$$

where $\phi$ represents optical phase delay resulting from the change in the effective index of refraction $n_{eff}$ of the electrooptic clad waveguide.

In accordance with yet another embodiment of the present invention, an integrated optical device is provided comprising first and second electrooptic clad waveguides of unequal length arranged to define an asymmetric Mach-Zehnder interferometer. The control electrodes are arranged to create an electric field in the first and second cladding regions of the first and second waveguides to induce a change in the effective index of refraction $n_{eff}$ of the first and second waveguides. In this manner, first and second wavelength components of an input optical signal may be directed selectively to separate ones of the optical outputs by controlling the electric field.

In accordance with yet another embodiment of the present invention, an integrated optical device is provided comprising first and second electrooptic clad waveguides arranged to define a directional coupling region. The waveguide core of the first waveguide is disposed between a first outer electrooptic cladding region and an electrooptic gap region in the directional coupling region. The waveguide core of the second waveguide is disposed between a second outer electrooptic cladding region and the electrooptic gap region in the directional coupling region. The control electrodes are arranged to create an electric field across the outer cladding regions and the electrooptic gap region, whereby an optical signal incident in one of the waveguides may be switched to the other of the waveguides.

In accordance with yet another embodiment of the present invention, an optical waveguide is provided comprising a waveguide core defining a core height dimension h that remains substantially constant between the optical input and the optical output. The core width dimension defines an input width $w_1$ at the optical input, an output width $w_2$ at the optical output, an increased-width $w_0$ along a phase compensating element of the waveguide core, and a decreased-width $w_3$ along a thinned-down portion of the waveguide core. The increased-width $w_0$ is greater than the input width and the decreased-width $w_3$ is less than the input width.

In accordance with yet another embodiment of the present invention, an optical waveguide is provided where the core width dimension defines an increased-width $w_0$ along a phase compensating element of the waveguide core and a decreased-width $w_3$ along a thinned-down portion of the waveguide core. The decreased-width $w_3$ is less than the core height dimension h and the increased-width $w_0$ is greater than the core height dimension h.

In accordance with yet another embodiment of the present invention an integrated optical device is provided comprising a plurality of channel waveguides and a thermo/electric poling arrangement. At least a pair of the waveguides are at least partially bounded along a portion of their length by respective electrooptic cladding regions defining respective polar axes. The thermo/electric poling arrangement is provided proximate the respective electrooptic cladding regions and is arranged to orient independently the respective polar axes of the cladding regions.

Accordingly, it is an object of the present invention to provide improved optical waveguides and integrated optical devices useful in applications requiring modulation and switching of optical signals. Other objects of the present invention will be apparent in light of the description of the invention embodied herein.

BRIEF DESCRIPTION OF THE SEVERAL
VIEWS OF THE DRAWINGS

The following detailed description of the preferred embodiments of the present invention can be best understood when read in conjunction with the following drawings, where like structure is indicated with like reference numerals and in which.

DETAILED DESCRIPTION

Figure 1:
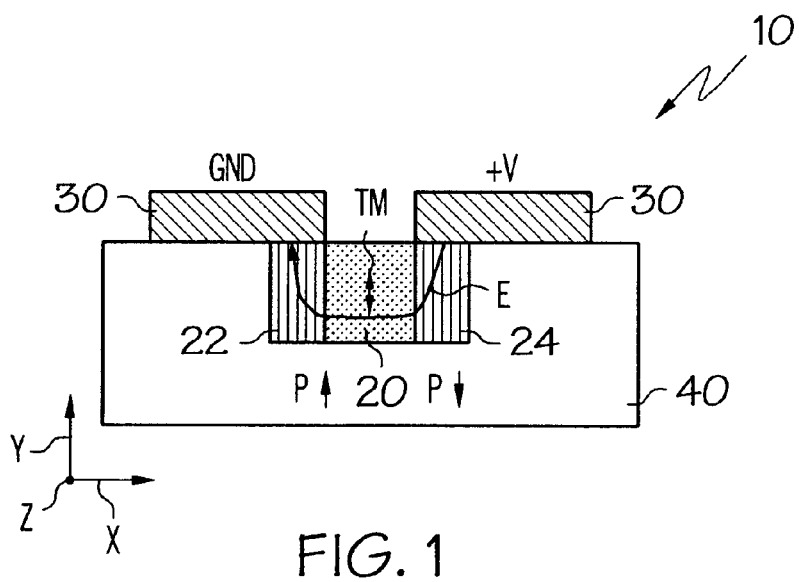
FIGS. 1–4 illustrate optical waveguides according to the present invention including electrooptic cladding regions poled in opposite directions.

The present invention is generally related to the use of poled polymeric electrooptic materials as cladding regions or layers around low loss non-electrooptic waveguide cores like silica waveguide cores. Electrooptic materials suitable for use in the present invention should have an index of refraction that is lower than the index of the waveguide core bounded by the cladding layers. Typically, the waveguide core is fabricated from doped silica and exhibits a refractive index $n_1$ of about 1.45 at 1550 nm. Conventional electrooptic materials exhibit a higher refractive index of about 1.6 at similar wavelengths. Such low-index materials are described in copending, commonly assigned U.S. patent application Ser. No. 09/777,439, filed Feb. 6, 2001, entitled FUNCTIONAL MATERIALS FOR USE IN OPTICAL SYSTEMS, the disclosure of which is incorporated herein by reference.

Generally, the polymeric electrooptic materials disclosed in the above-noted patent application include thermoplastic or thermosetting polymers that are blended or co-polymerized with an electrooptic chromophore. The thermoplastic or thermosetting polymer is typically selected from the group consisting of acrylics/methacrylics, polyesters, polyurethanes, polyimides, polyamides, polyphosphazenes, epoxy resins, and hybrid (organic-inorganic) or nanocomposite polyester polymers. Combinations of thermoplastic and thermosetting polymers (interpenetrating polymer networks) are also contemplated. The thermoplastic and/or thermosetting polymers typically have glass transition temperatures above 100° C. One embodiment for low-index materials has a refractive index value less than 1.5 while another embodiment for high-index materials has a refractive index value greater than 1.5. The polymers are combined with chromophores, either as part of the backbone chain or blended and typically contain compatibilization additives or groups and/or adhesion-promotion additives or groups. The electrooptic chromophore according to the invention is typically a substituted aniline, substituted azobenzene, substituted stilbene, or substituted imine.

Optical Channel Waveguides

FIGS. 1–4 illustrate schematically two types of optical channel waveguides 10 according to the present invention. Each of the optical waveguides illustrated in FIGS. 1–4 employs oppositely poled cladding regions and a substantially non-electrooptic core. For the purposes of defining and describing the present invention, it is noted that a substantially non-electrooptic material, silica for example, is a material that is not inherently electrooptic. Of course, substantially non-electrooptic materials may exhibit a small electrooptic effect under relatively high electric fields.

Referring further to FIGS. 1–4, each electrooptic clad waveguide 10 comprises an optical waveguide core 20 and first and second cladding regions 22, 24. The optical waveguide core 20 defines a primary axis of propagation z that lies substantially along the center of the waveguide core, running the length of the core 20. To preserve clarity, the z axis is labeled in FIGS. 1, 5, and 6 offset from the center of the waveguide core 20.

The first cladding region 22 is offset from the z axis in a first direction along an x axis perpendicular to the z axis. The second cladding region 24 is offset from the z axis in a second opposite direction along the x axis. A set of control electrodes 30 are arranged to create an electric field E in the first and second cladding regions 22, 24 that alters the refractive index of the cladding regions. The waveguide 10 is supported by a substrate 40.

Those practicing the present invention familiar with optical waveguide technology will appreciate that a variety of materials are acceptable for use as the control electrodes 30, the under-cladding layer 26, and the substrate 40. For example, the control electrodes may be formed from gold. The core 20 may be formed from Ge-doped fused silica and is typically 8 μm square in cross section. The substrate 40 is most commonly formed of silicon and may be about 0.5 mm thick. An under-cladding layer 26 (shown in FIG. 10) is also typically provided between the substrate 40 and the core 20 and may formed from at least 15 micron thick fused silica.

Figure 2:
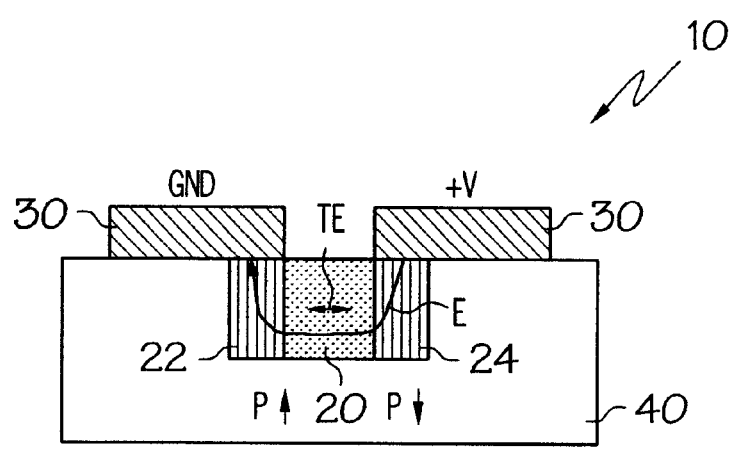
Figure 3:
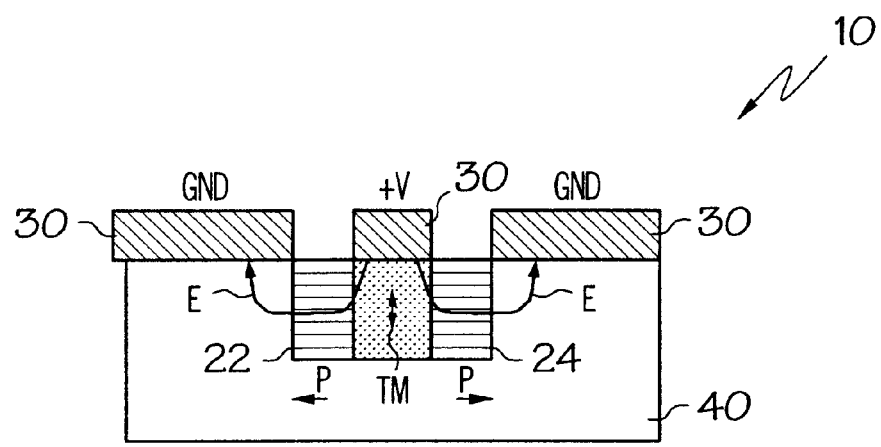
Figure 4:
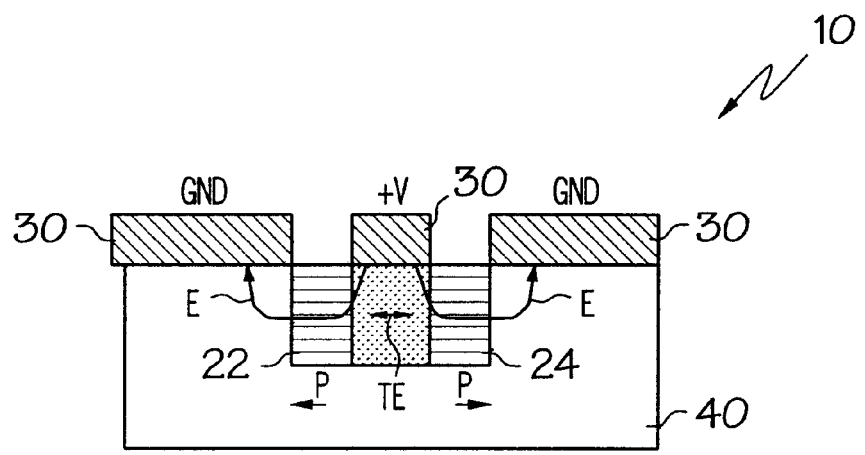

In the embodiments of FIGS. 1 and 2, the first and second cladding regions 22, 24 are both vertically poled but each is poled in a different direction, as indicated by the directional arrows P. Similarly, in FIGS. 3 and 4, the first and second cladding regions 22, 24 are both horizontally poled but each is poled in a different direction, as indicated by the directional arrows P. The first and second cladding regions 22, 24 of each embodiment are poled in opposite directions to ensure that the refractive indices of the cladding regions change in the same relative direction upon creation of the electric field E. More specifically, the refractive indices of the cladding regions 22, 24 on both sides of the core 20 either increase under the electric field E or decrease under the electric field E.

The above-described change in refractive index may be represented by the following equation $$\Delta n = -\tfrac{1}{2} n^3 r_{ij} E_j$$

where $r_{ij}$ is the Pockels electrooptic coefficient of the cladding region at issue and $E_j$ represents the strength and orientation of the applied electric field. The control electrodes 30 are preferably arranged such that the above-noted quantitative combination of the electric field and the poling in the first cladding region is substantially equivalent to a quantitative combination of the electric field and the poling in the second cladding region. It is contemplated by the present invention that other equations, formulas, or relations may be used to quantify the combination of the electric field and the poling in the cladding regions according to the present invention.

For the purposes of describing and defining the present invention, it is noted that TE and TM polarized light represent two independent electromagnetic modes of an optical signal. The electromagnetic field distribution is referred to as the transverse electric (TE) mode where the electric field of the optical signal lies in the plane that is perpendicular to the z-axis. The electromagnetic field distribution is referred to as the transverse magnetic (TM) mode where the magnetic field of the optical signal lies in the plane that is perpendicular to the z-axis. It is also noted that in a channel waveguide of the illustrated type, the propagating modes are not purely TE or TM polarized. Rather, the modes are typically more predominantly one or the other and are commonly so designated.

Figure 10:
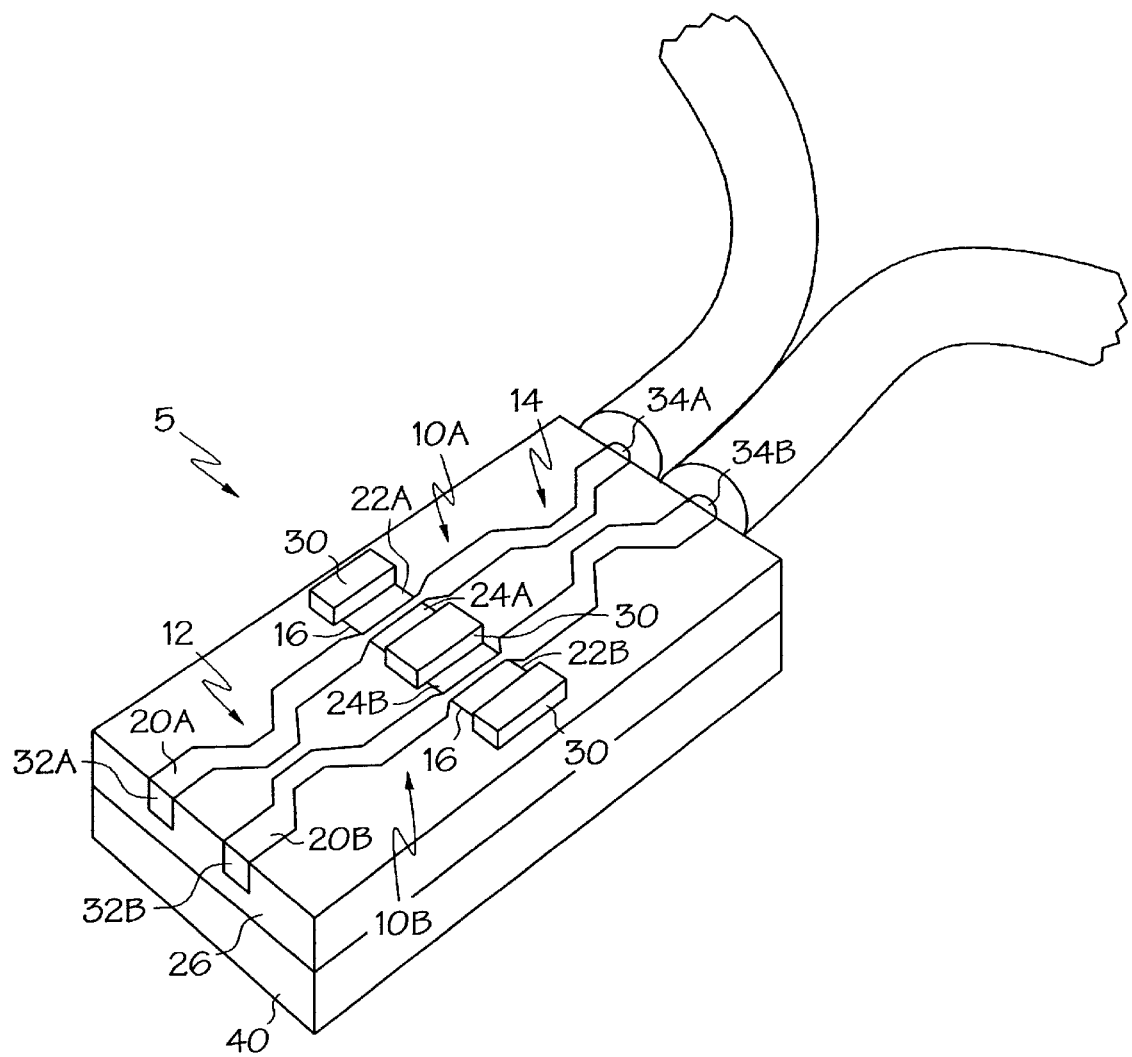
FIG. 10 illustrates a polarization-independent optical intensity modulator or 2×2 optical switch according to the present invention.

In the waveguide arrangement of FIGS. 1 and 2, TM polarized light propagating along the primary axis of propagation z of the waveguide 10 encounters an ordinary change in refractive index $n_o$, upon creation of the electric field E, while TE polarized light propagating along the same path encounters an extraordinary change in refractive index $n_e$. In contrast, in the waveguide arrangement of FIGS. 3 and 4, TM polarized light propagating along the primary axis of propagation z of the waveguide 10 encounters the extraordinary refractive index $n_e$ while TE polarized light propagating along the same path encounters the ordinary refractive index $n_o$. This complementary relationship between the vertically and horizontally poled cladding regions may be utilized in a variety of embodiments of the present invention to create polarization-independent integrated optical devices, one of which is illustrated in FIG. 10, discussed below.

It is noted that a non-electrooptic outer optical cladding layer may be defined about a periphery of the core 20, between the first cladding region 22 and the core 20 and the second cladding region 24 and the core 20. It is further noted that the first and second cladding regions 22, 24 may cooperate to enclose the entire periphery of the core 20, as opposed to merely bounding the left and right sides of the core 20. The cladding regions are preferably formed of the same material to help ensure they exhibit equivalent optical and electrooptical properties.

Alternative Electrooptic Clad Waveguide

Figure 5:
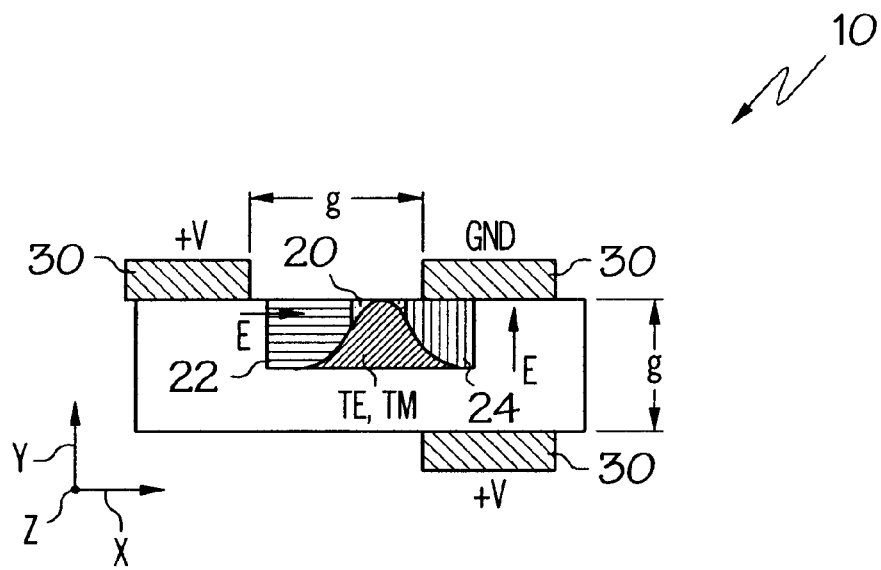
FIG. 5 illustrates an optical waveguide according to the present invention including electrooptic cladding regions poled in perpendicular directions.

Referring now to FIG. 5, an alternative electrooptic clad waveguide arrangement is illustrated. The embodiment of FIG. 5 differs from that illustrated in FIGS. 1 and 2 in that the first and second cladding regions 22, 24 of FIG. 5 are poled in perpendicular directions, as opposed to opposite parallel directions. Also illustrated in FIG. 5 is a representation of the optical wave intensity contour TE, TM of the propagating optical signal. The control electrodes 30 are arranged to provide appropriate poling orientations and to ensure that the electric field created in the first cladding region 22 is substantially perpendicular to the electric field created in said second cladding region 24. It is contemplated that alternative control electrode arrangements will also be well suited for the illustrated embodiment.

The waveguide of FIG. 5 achieves polarization-independent single channel phase shifting or modulation through the independently poled cladding regions 22, 24, which optimize phase shifting of one dominant polarization (TE) in the first cladding region 22 and the other dominant polarization (TM) in the second cladding region 24. The embodiment of FIG. 5 may be represented in a beam-propagation modeling tool to verify polarization independence. The beam-propagation modeling tool may also be used to determine alternative control electrode arrangements. Parameters used in the beam propagation modeling for the illustrated embodiment are as follows:

| | |
|---|---|
| Electrode gap, g | 20 $\mu$m |
| Electrooptic coefficient (parallel optic and electric field), $r_{PP}$ | 60 pm/V |
| Electrooptic coefficient (perpendicular optic and electric field), $r_{1P}$ | 20 pm/V |
| Substrate index, $n_0$ (fused silica) | 1.44409 |
| Wavelength of optical signal, $\lambda_0$ | 1.55 $\mu$m |
| Waveguide core height | 8 $\mu$m |
| Index difference between core and cladding | 0.35% |

Single Channel Phase Shifter or Modulator

Figure 6:
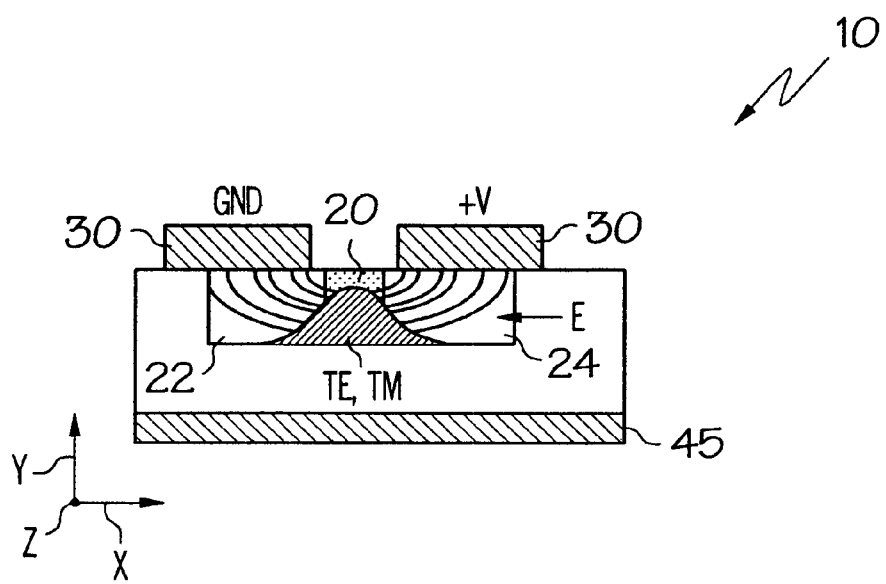
FIG. 6 illustrates an optical waveguide according to the present invention including electrooptic cladding regions poled along a contoured electric field.

FIG. 6 represents a further example of a polarization-independent single channel phase shifter or modulator and illustrates contoured poling as opposed to the horizontal and vertical poling of the embodiments illustrated in FIGS. 1–5. Specifically, in the arrangement of FIG. 6, the control electrodes 30 and a dielectric medium 45 are arranged to create a contoured electric field E in the non-electrooptic core 20 and the first and second cladding regions 22, 24. This electric field E may be used to pole the first and second cladding regions 22, 24, in which case, the poling of the first and second cladding regions 22, 24 may be contoured in the same direction as the electric field E.

The control electrodes 30 are also used to initiate the electrooptic modification of the refractive indices of the first and second cladding regions 22, 24, as described above with reference to FIGS. 1–5. The dielectric medium 45 is typically provided on a surface of the waveguide 10 opposite the surface upon which the control electrodes 30 are disposed, as is illustrated in FIG. 6. Preferably, the cladding regions 22, 24 are at least partially disposed between the first and second control electrodes 30 and the dielectric constant medium 45. As is described in further detail herein, the contoured electric field E and the respective directions of polarization in the first and second cladding regions 22, 24 define a polarization-independent waveguide structure along the primary axis of propagation of the electrooptic clad waveguide 10. It is contemplated that additional control electrodes 30 may be provided to further tailor the profile and orientation of the electric field E.

The dielectric medium 45 can have a significant effect on the contour of the electric field E. Specifically, the contour of the electric field E may be made more vertical in the cladding regions 22, 24 by increasing the dielectric constant of the dielectric medium 45. Conversely, the contour of the electric field E may be made more horizontal in the cladding regions 22, 24 by decreasing the dielectric constant of the dielectric medium 45. The distance between the dielectric medium 45 and the control electrodes 30 will also have an effect on the contour of the electric field E. The contoured electric field E is substantially symmetric and is defined by substantially equivalent x and y components in an x-y plane defined by the x and y axes. Stated differently, the vertical and horizontal components of the contoured electric field E are balanced in each of the cladding regions 22, 24. In this manner, the x and y components in each of the cladding regions 22, 24 define substantially equivalent phase control of respective TE and TM modes of propagation of an optical signal propagating along the primary axis of propagation z and enable substantially equivalent phase modification of the TE and TM modes of the optical signal.

As will be appreciated by those practicing the present invention, the cladding regions 22, 24 are poled by what may be described as a thermo/electric poling arrangement because the poling is controlled by increasing the temperature of the device, or at least the regions to be poled, imposing the contoured electric field E, and then cooling the device to room temperature with the field still applied. As is illustrated in FIG. 6, the thermo/electric poling arrangement of the present invention is arranged to orient independently the respective polar axes of the cladding regions.

In certain contexts it may be desirable to use electrooptic or otherwise functional waveguide materials in addition to electrooptic cladding regions. To accomplish this objective, the channel waveguides may be constructed of a ferroelectric material, e.g., a crystalline ferroelectric oxide, having a Curie temperature that is greater than the processing temperature of the thermo/electric poling arrangement.

Phase-Modulating Integrated Optical Device

Figure 7:
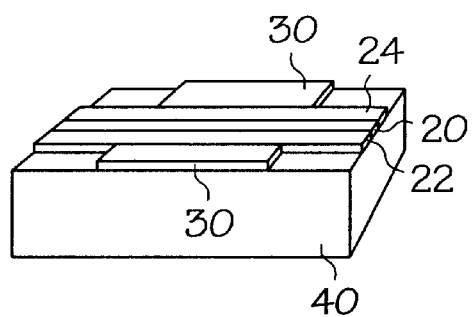
FIGS. 7–9 illustrate an integrated optical device according to the present invention including a thinned-down waveguide channel.
Figure 8:
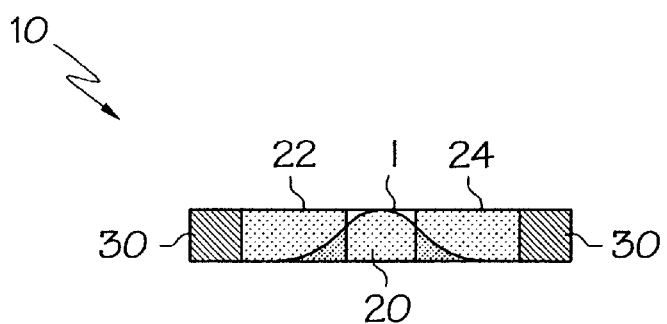
Figure 9:
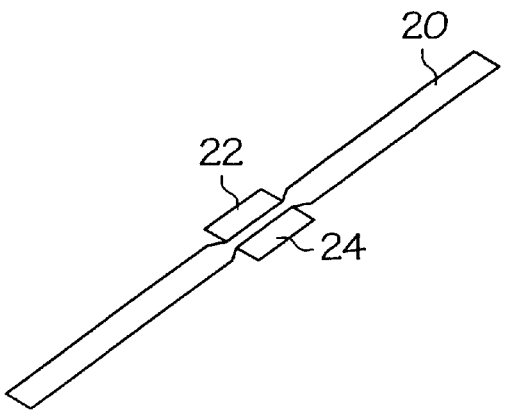

FIGS. 7–9 illustrate a further arrangement for a phase-modulating integrated optical device according to the present invention. In the arrangement of FIGS. 7 and 8, the control electrodes 30 are positioned adjacent the first and second cladding regions 22, 24, in generally the same plane as the waveguide core 20. FIG. 8 illustrates a computed transverse mode profile I of an optical signal propagating along the waveguide 10. According to one aspect of the present invention illustrated in FIG. 9, the transverse dimension or width of the waveguide core 20 is "thinned-down." Specifically, the cross-sectional x axis width of the core 20 decreases from a region outside of the first and second cladding regions 22, 24 to a region bounded by the first and second cladding regions 22, 24. Optimum device design may be achieved by placing a greater portion of the optical energy of the signal in the cladding regions 22, 24.

The following table illustrates the influence of the cladding index $\Delta n_{clad}$ on the effective index $\Delta n_{eff}$ of the waveguide for three different core widths.

| Core Width | $\Delta\phi/\Delta n_{clad}$ | $\Delta n_{eff}/\Delta n_{clad}$ |
|---|---|---|
| 3 µm | $-16.7 \times 10^3$ radians | 0.441 |
| 5 µm | $-7.88 \times 10^3$ radians | 0.194 |
| 7 µm | $-4.19 \times 10^3$ radians | 0.103 |

The electrooptic clad waveguide is characterized by an optical phase delay $\phi=2\pi L n_{eff}/\lambda$, where $n_{eff}$ is the effective index of refraction of the waveguide, $\lambda$ is the wavelength of light propagating along the optical path, and L is the length over which the phase delay occurs. The data show that with proper design of the waveguide core 20, the cladding index $\Delta n_{clad}$ can have a strong influence on the effective index $\Delta n_{eff}$ of the waveguide 10. Specifically, for the 3 µm core 20, the change in the effective index $\Delta n_{eff}$ of the waveguide 10 is about 45% of the value of the change in the cladding index $\Delta n_{clad}$. The change in the effective index $\Delta n_{eff}$ of the waveguide 10 can be described as being core independent because the core is substantially non-electrooptic. The first and second control electrodes 30 merely create an electric field in the first and second cladding regions capable of changing the refractive indices of the first and second electrooptic cladding regions 22, 24 without a corresponding change in the refractive index $n_1$ of the waveguide core 20.

Preferably, the cross-sectional x axis width of the core 20, decreases by about 40–60%. In preferred embodiments of the present invention, the cross-sectional x axis decreases in width from about 5–8 µm in the region outside of the first and second cladding regions to about 3 µm in the region bounded by the first and second cladding regions. Intensity Modulator or 2×2 Polarization-independent Optical Switch Referring now to FIG. 10, an integrated optical device 5 according to the present invention is illustrated. The optical device 5 may take the form of an intensity modulator or a 2×2 polarization-independent optical switch. The optical device 5 comprises first and second waveguides 10A, 10B arranged to define a Mach-Zehnder interferometer. Generally, the Mach-Zehnder interferometer comprises an electrooptically controlled phase shifter along each of the first and second waveguides 10A, 10B, a beam splitter 12 at the input side of the interferometer and a beam combiner 14 at the output side of the interferometer. The optical signal output $I_{out}$ at each waveguide 10A, 10B may be controlled by varying the relative phase difference across both of the waveguides 10A, 10B to alter the interference at the combiner 14.

The arrangement illustrated in FIG. 10 includes first and second directional coupling regions in the form of a beam splitter 12 and a beam combiner 14, an intermediate coupling region 16 disposed between the first and second directional coupling regions 12, 14 and a set of control electrodes 30. The first and second cladding regions 22A, 24A, 22B, 24B may be poled in opposite directions, in perpendicular directions, or in substantially the same direction, as is described above with reference to FIGS. 1–6. Further, the waveguide cores 20A, 20B may define a cross-sectional x axis width that decreases in the manner described above.

In the context of an intensity modulator, the device is provided with an optical input 32A and a pair of optical outputs 34A, 34B. At least one of the first and second waveguides 10A, 10B comprises a phase shifter in the form of an electrooptic clad waveguide according to the present invention. The non-electrooptic optical waveguide cores 20A, 20B define a refractive index $n_1$ and are disposed between first and second cladding regions 22A, 24A, 22B, 24B in the intermediate coupling region 16. Each of the cladding regions 22A, 24A, 22B, 24B comprises a poled electrooptic polymer defining a refractive index that is less than $n_1$.

The control electrodes 30 are arranged to create an electric field in the first and second cladding regions 22A, 24A, 22B, 24B. The electric field changes the refractive indices of the first and second electrooptic cladding regions 22A, 24A, 22B, 24B to induce a change in the effective index of refraction $n_{eff}$ of the electrooptic clad waveguides 10A, 10B. As is described above, an optical phase delay $\phi$ is introduced in the waveguides 10A, 10B due to the change in the effective index of refraction $n_{eff}$ of the waveguide 10A, 10B, i.e., $\phi=2\pi L n_{eff}/\lambda$.

Preferably, as is noted above with reference to FIGS. 1–4, the control electrodes 30 are arranged such that a quantitative combination of the electric field and the poling in the first cladding regions 22A is substantially equivalent to a quantitative combination of the electric field and the poling in the second cladding region 24A. Similarly, a quantitative combination of the electric field and the poling in the first cladding regions 22B is substantially equivalent to a quantitative combination of the electric field and the poling in the second cladding region 24B.

If the two directional coupling regions 12, 14 are set as 50% beam splitters, then the optical output intensity $I_{out}$ at the optical outputs 34A, 34B are related to the optical input intensity $I_{in}$ according to the following equations $$|I_{out}|^2 = |I_{in}|^2 \sin^2\left(\frac{\phi}{2}\right)$$

$$|I_{out}|^2 = |I_{in}|^2 \cos^2\left(\frac{\phi}{2}\right)$$

where $\phi$ represents optical phase difference across both waveguides 10A, 10B resulting from the change in the effective index of refraction $n_{\it eff}$ in each electrooptic clad waveguide 10A, 10B. Thus, by controlling the voltage across the control electrodes 30, the arrangement illustrated in FIG. 10 may be utilized to modulate the optical intensity at the optical outputs 34A, 34B.

The arrangement illustrated in FIG. 10 may also be utilized to operate as a 2×2 polarization-independent optical switch. Specifically, where separate optical signals are provided at the first and second optical inputs 32A, 32B the control electrodes 30 can be arranged to create an electric field in the first and second cladding regions 22A, 24A, 22B, 24B of the first and second waveguides 10 to induce a change in an effective index of refraction $n_{\it eff}$ of the first and second waveguides 10A, 10B. In this manner, input optical signals may be directed selectively to separate ones of the optical outputs 34A, 34B by controlling the electric field applied to the first and second cladding regions 22A, 24A, 22B, 24B of the first and second waveguides 10.

To ensure polarization independence, the poling of the first and second cladding regions 22A, 24A of the first waveguide 10A is substantially perpendicular to the poling of the first and second cladding regions 22B, 24B of the second waveguide 10B. In this manner, the polarization of an input optical signal is of no concern to the effectiveness of the 2×2 switch because, each waveguide 10A, 10B is configured to modulate a selected polarization more than another. In the illustrated embodiment, the waveguide 10A will modulate TE polarized light significantly more than TM polarized light but the waveguide 10B will modulate TM polarized light more than TE polarized light by roughly the same relative proportions. Accordingly, TE and TM polarized light propagating along the first and second waveguides 10A, 10B are phase modulated to different degrees in each of the waveguides but to substantially equal degrees across both of the waveguides, yielding a polarization-independent optical device.

High-frequency Modulator

Figure 11:
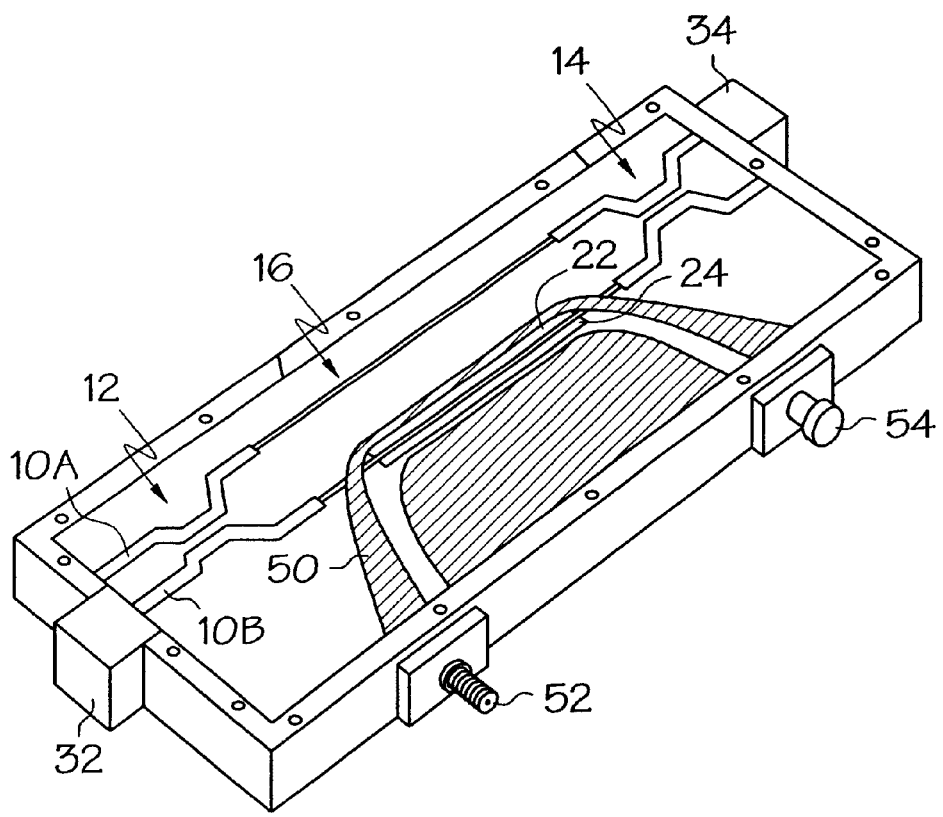
FIG. 11 illustrates a high-frequency electrooptic modulator according to the present invention.

Referring now to FIG. 11, an integrated optical device 5 according to the present invention is illustrated. The optical device 5 is similar to that illustrated in FIG. 10 but takes the form of a high-frequency modulator. Specifically, the device 5 comprises first and second waveguides 10A, 10B arranged to define a Mach-Zehnder interferometer including first and second directional coupling regions 12, 14, an intermediate coupling region 16, a set of control electrodes 30, an optical input 32, and an optical output 34.

The second waveguide 10B comprises an electrooptic clad waveguide portion, as described above with reference to FIGS. 1–10. The control electrodes 30 form a traveling wave stripline 50 and are arranged to create an electric field in the first and second cladding regions 22, 24. As is described above, the electric field changes the refractive indices of the first and second electrooptic cladding regions 22, 24 and induces a change in an effective index of refraction $n_{\it eff}$ of the electrooptic clad waveguide 10B and a corresponding phase shift $\phi$ in the optical signal. As will be appreciated by those practicing the present invention, a traveling wave stripline comprises a strip transmission line that includes a center conductor separated from outer conductors by dielectric strips.

The traveling wave stripline 50 utilized in the illustrated embodiment of the present invention comprises a microwave input port 52 and a 50Ω termination 54 and is characterized by a dielectric constant $\in$ at microwave frequencies. The dielectric constant $\in$ is selected such that an optical signal propagating in the electrooptic clad waveguide 10B propagates at the same velocity as an electrical signal propagating in the traveling wave stripline 50. Typically, the integrated optical device is configured such that $\in = (n_{\it eff})^2$. Velocity matching of the electrical and optical signals is often more easily achieved using low dielectric constant materials such as polymers and glass.

Wavelength-dependent Optical Switch

Figure 12:
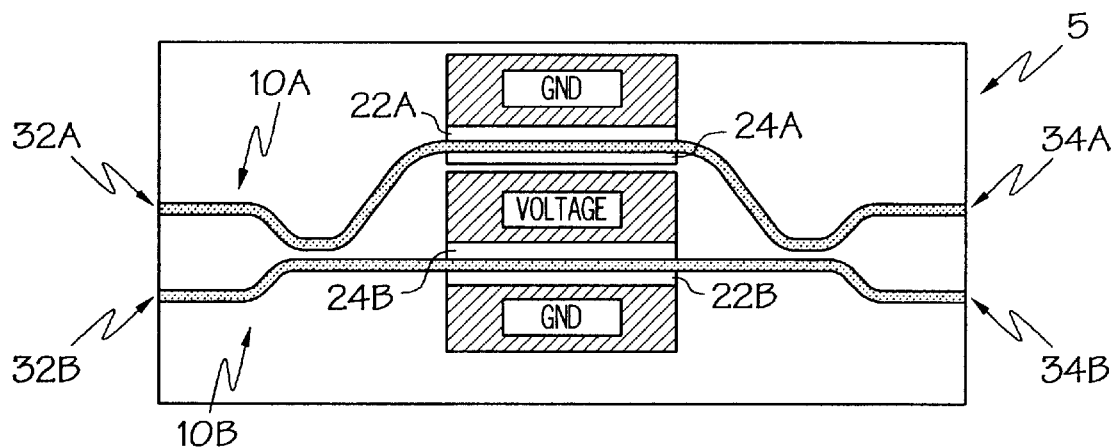
FIG. 12 illustrates a wavelength-dependent optical switch according to the present invention.

A wavelength-dependent optical switch according to the present invention is illustrated schematically in FIG. 12. The optical device 5 is similar to that illustrated in FIG. 10 with the exception that the optical path length of the second electrooptic clad waveguide 10B is reduced, relative to the first electrooptic clad waveguide 10A—forming what is referred to as an asymmetric Mach-Zehnder interferometer. As is the case in the embodiment illustrated in FIG. 10, to ensure polarization-independent operation, the poling of the first and second cladding regions 22A, 24A of the first waveguide 10A is substantially perpendicular to the poling of the first and second cladding regions 22B, 24B of the second waveguide 10B.

First and second wavelength components $\lambda_1$, $\lambda_2$ of an optical signal at input 32A may be directed selectively to separate ones of the optical outputs 34A, 34B by establishing a suitable difference $\Delta L$ between the optical path lengths of the first and second waveguides 10A, 10B and controlling the electric field across the electrooptic cladding regions 22A, 24A, 22B, 24B. Specifically, where the input signal at 32A includes the first and second wavelength components $\lambda_1$, $\lambda_2$, the signals at outputs 34A and 34B will comprise only one of the wavelength components ($\lambda_1$ or $\lambda_2$) for each output 34A, 34B and may be flip-flopped as follows, depending upon the nature of the electric field applied to the control electrodes 30:

| | Input Signal - 32A | Output Signal - 34A | Output Signal - 34B |
|---|---|---|---|
| Normal State | $\lambda_1, \lambda_2$ | $\lambda_1$ | $\lambda_2$ |
| Flip-Flopped | $\lambda_1, \lambda_2$ | $\lambda_2$ | $\lambda_1$ |

The voltage required for proper switching depends upon a number of parameters including the electrooptic coefficient of the polymeric cladding, the interaction length, the waveguide width, etc. The wavelength-dependent switch illustrated in FIG. 12 may be made polarization-independent by poling the cladding regions and arranging the electrodes as taught herein with reference to FIG. 10.

Directional Coupler

Figure 13:
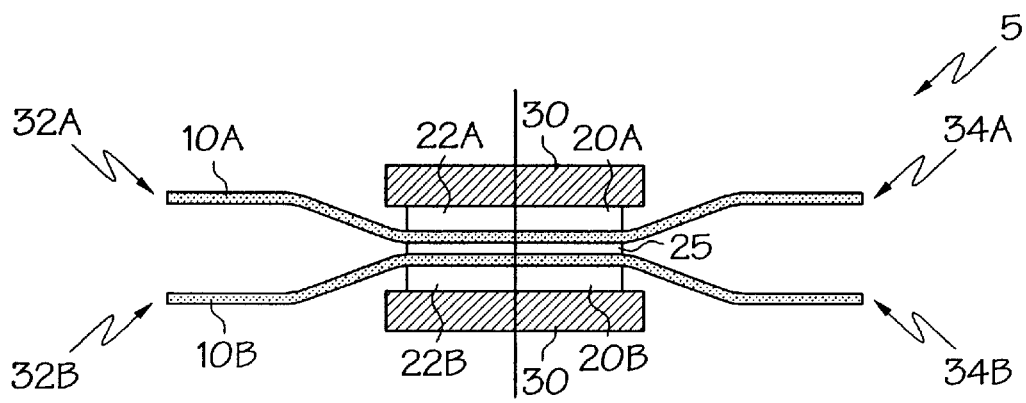
FIG. 13 illustrates an integrated optical device according to the present invention including a specialized electrooptic directional coupler.
Figure 14A:
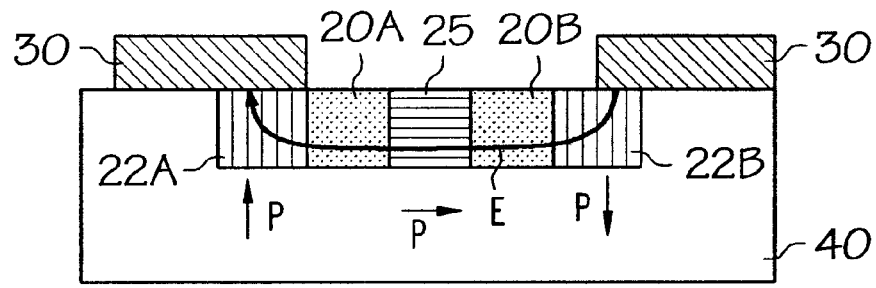
FIGS. 14A and 14B illustrate electrode and poling arrangements suitable for use in the integrated optical device of FIG. 13.
Figure 14B:
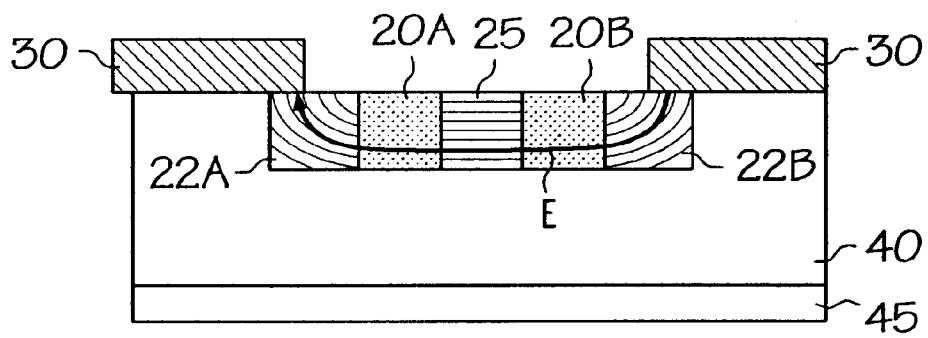

The optical device 5 illustrated schematically in FIGS. 13, 14A and 14B comprises a directional coupler including first and second electrooptic clad waveguides 10A, 10B arranged to define a directional coupling region 12, a set of control electrodes 30, first and second optical inputs 32A, 32B, and first and second optical outputs 34A, 34B. The first electrooptic clad waveguide 10A comprises a substantially non-electrooptic optical waveguide core 20A defining a refractive index $n_1$. The waveguide core 20A of the first waveguide is disposed between a first outer electrooptic cladding region 22A and an electrooptic gap region 25 in the directional coupling region 12. The first outer cladding region 22A comprises a poled electrooptic polymer defining a refractive index that is less than $n_1$. The electrooptic gap region 25 also comprises a poled electrooptic polymer defining a refractive index that is less than $n_1$.

The second electrooptic clad waveguide 10B comprises a substantially non-electrooptic optical waveguide core 20B defining a refractive index $n_1$. The waveguide core 20B of the second waveguide 10B is disposed between a second outer electrooptic cladding region 22B and the electrooptic gap region 25. The second outer cladding region 22B comprises a poled electrooptic polymer defining a refractive index that is less than $n_1$. The control electrodes 30 are arranged to create an electric field across the outer cladding regions 22A, 22B and the electrooptic gap region 25, whereby an optical signal incident in one of the waveguides 10A, 10B may be switched to the other of the waveguides 10A, 10B.

As is noted above, the outer cladding regions or the gap regions may be poled to render the directional coupling region polarization-independent. The amount of light that couples between two optical waveguides depends on the propagation constants of the two waveguides, the distance between the two waveguides, and the length of the interaction region. In the illustrated embodiment, the propagation constant of waveguide core 20A is influenced predominantly by its index of refraction, the index of the outer cladding region 22A, and the index of the gap region 25. Since the outer cladding region 22A and the gap region 25 are electrooptic, the propagation constant is influenced by the applied electric field through the outer cladding region 22A and the gap region 25. In a similar way, the propagation constant of waveguide core 20B is influenced predominantly by its index of refraction, the index of the outer cladding region 22B, and the index of the gap region 25. To achieve polarization-independent coupling, the two polarizations must encounter the same propagation constants.

Referring now to FIG. 14A, a polarization-independent design is illustrated where, with proper placement of the control electrodes 30, the gap region 25 is poled and arranged to predominantly influence TE polarized light and the outer cladding regions 22A, 22B are poled and arranged to predominantly influence the TM polarized light in the respective waveguide cores 20A, 20B.

FIG. 14B shows an alternative to the poling arrangement illustrated in FIG. 14A. A contoured poling arrangement similar to that described herein with reference to FIG. 6 is illustrated in FIG. 14B. Specifically, in the arrangement of FIG. 14B, the control electrodes 30 and the dielectric medium 45 are arranged to create a contoured electric field E in the non-electrooptic cores 20A and 20B, the first and second electrooptic outer cladding regions 22A and 22B, and the electrooptic gap region 25. As is described above with reference to the contoured poling arrangement of FIG. 6, the vertical and horizontal components of the contoured electric field E are appropriately arranged in the outer cladding regions 22A, 22B and the gap region 25 to achieve equal coupling for the TE and TM polarizations.

Phase Compensating Element

Each of the embodiments of the present invention may utilize the thinned-down waveguide core illustrated in FIG. 9 to optimize the effect of the electrooptic cladding regions on the optical signal. However, where a thinned-down core is utilized, it may be necessary to employ a phase compensating element 80 in the manner illustrated in FIG. 17. Specifically, referring to FIGS. 15–17, the present applicants have recognized that a width reduction in a fixed height waveguide core creates a phase change difference between the TE and TM modes over a given length of a thinned-down waveguide segment 85. Accordingly, an increased-width phase compensating element 80 according to the present invention is introduced along the optical signal path to compensate for the phase change induced by the reduced-width or thinned-down segment 85. Tapered transitions 82 couple adjacent waveguide portions to the phase compensating element 80 and the thinned-down waveguide segment 85.

Figure 15:
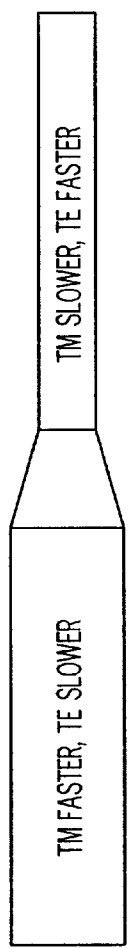
FIG. 15 illustrates schematically the relationship of TE and TM modes as an optical signal propagates through a reduced-width waveguide segment.
Figure 16:
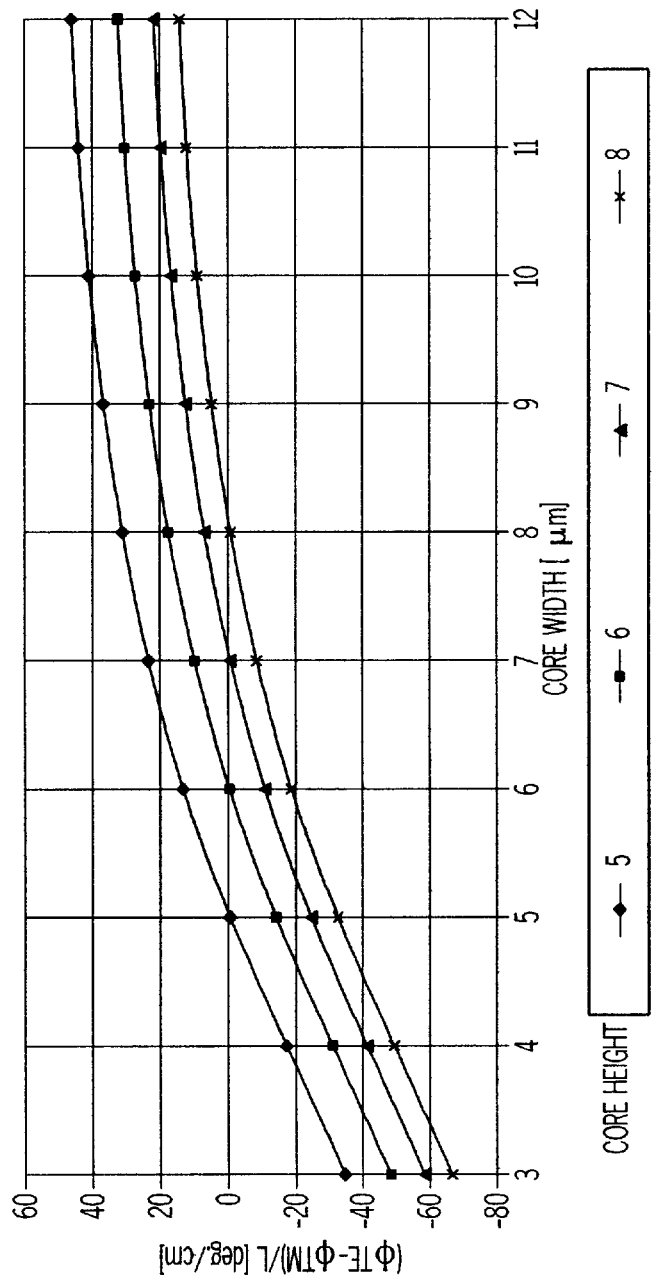
FIG. 16 is a graphical representation of data that may be used to design an appropriate compensating waveguide segment.

FIG. 15 illustrates schematically the relationship of TE and TM modes as an optical signal propagates through a reduced-width waveguide segment. The change in relative velocity of the two modes creates a phase change difference ($\phi_{TE}-\phi_{TM}$) over a given waveguide length L. The magnitude of the phase change difference varies as a function of the height h of the waveguide core and the length L and width w of the reduced-width segment. FIG. 16 illustrates phase change differences ($\phi_{TE}-\phi_{TM}$) per unit length L for a number of different core heights h (5, 6, 7, and 8 $\mu$m) over a range of widths w (3–12 $\mu$m).

Figure 17:
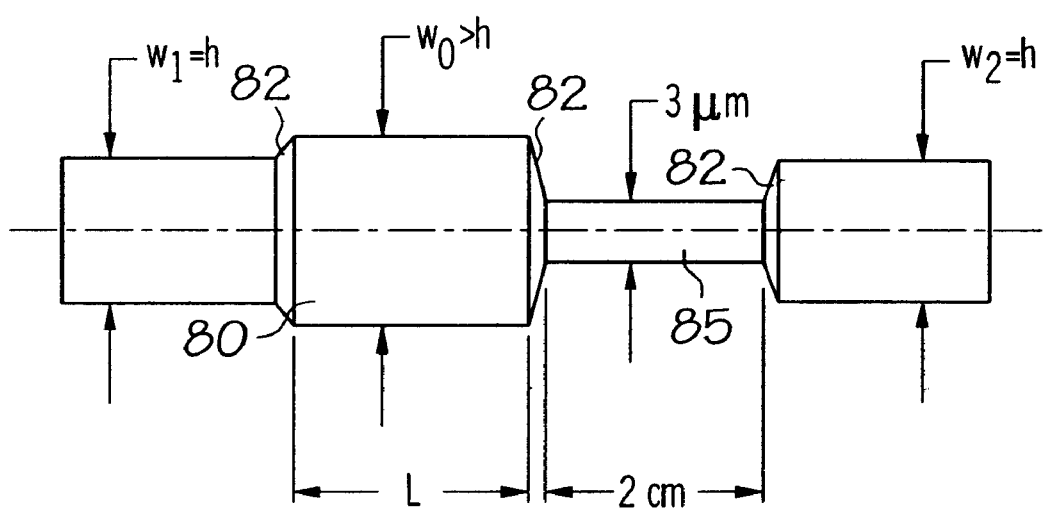
FIG. 17 illustrates an increased-width phase compensating element according to the present invention.

Referring to FIG. 17, the data of FIG. 16 may be used to design an appropriate compensating waveguide segment 80 according to the present invention. For example, given a square waveguide with a core height h of 5 $\mu$m and a rectangular reduced-width core segment with the same height and a reduced-width of 3 $\mu$m, it may be noted that the reduced-width core segment 85 will introduce a phase change difference of about −35 deg./cm. Accordingly, to compensate for the −35 deg./cm phase change difference the compensating waveguide segment 80 should be designed to introduce a phase change difference of about +35 deg./cm. Given the same core height of 5 $\mu$m, it may then be noted from the data of FIG. 16 that core width of the compensating waveguide segment should be about 8.5 $\mu$m to introduce the +35 deg./cm compensation. In the illustrated embodiment, the thinned-down portion defines a length of about 2 cm, the compensating element defines a length that is at least about 2 cm, and the tapered transitions define a length of about 0.3 cm.

As is noted above, the phase shift data is presented in FIG. 16 as a function of the length L of the compensating waveguide segment 80. Accordingly, it is also possible to control the compensating phase shift introduced by the compensating waveguide segment 80 by controlling its length L. For example, referring to FIG. 17, the above-noted −35 deg./cm phase change difference may be compensated for by (i) utilizing the compensating waveguide segment discussed above, having a core width of about 8.5 μm and a length equal to the length of the reduced-width core segment 85 (L=2 cm) or by (ii) utilizing a compensating waveguide segment having a core width of about 6.5 μm and a length twice that of the length of the reduced-width core segment 85 (L=4 cm). One problem with this approach, however, is that the length L can become too large for the practicalities of device design. Accordingly, preferred parameters compensate for phase shifting while minimizing the length dimension L.

It is noted that selected features of the many embodiments described herein may be utilized in other embodiments of the present invention despite the fact that each embodiment description does not reference a particular feature. For example, it is contemplated that each of the embodiments described herein may take advantage of the thinned down waveguide core illustrated in FIG. 9. Further, many of the devices described herein may be rendered polarization-independent by observing the poling illustrated in FIG. 10.

It is also contemplated that the electrooptic cladding regions described herein may be replaced with other optically functional materials having a refractive index that may be controlled in response to a control parameter. Other suitable optically functional materials include non-linear materials, thermooptic materials, magnetooptic materials, and piezoelectric or electrostrictive materials with appropriate changes in electrode arrangements. For the purposes of defining and describing the present invention, it is noted that these materials are simply referred to herein as optically functional materials. The non-electrooptic analogs of the optically functional materials are referred to herein as optically non-functional materials. As is described above in relation to the electrooptic materials, the capability of independently orienting two or more optically functional cladding material regions provides additional flexibility in device design.

For the purposes of describing and defining the present invention, it is noted that the term "substantially" is utilized herein to represent the inherent degree of uncertainty that may be attributed to any quantitative comparison, value, measurement, or other representation. For example, although certain electric fields are illustrated herein as being perpendicular to each other, it should be appreciated that it would be virtually impossible to ensure that the two fields are exactly perpendicular to each other because there would always a specific degree of uncertainty in the methodology utilized to establish the perpendicular relationship. The term "substantially" is also utilized herein to represent the degree by which the quantitative representation may vary from a stated reference without resulting in a change in the basic function of the subject matter at issue. For example, the optical waveguide core 20 of the present invention is defined herein as being "substantially" non-electrooptic because, although the core may exhibit electrooptic properties under some conditions, the electrooptic properties so exhibited would not result in a material change to the optical signal therein under normal conditions.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An electrooptic clad waveguide comprising an optical waveguide core defining a primary axis of propagation z, a first cladding region offset from said z axis in a first direction along an x axis perpendicular to said z axis, and a second cladding region offset from said z axis in a second direction along said x axis, wherein:
    said optical waveguide core comprises a substantially non-electrooptic material defining a refractive index $n_1$;
    said first cladding region comprises an electrooptic polymer defining a refractive index that is less than $n_1$;
    said second cladding region comprises an electrooptic polymer defining a refractive index that is less than $n_1$;
    said first and second cladding regions are poled in opposite directions; and
    said first and second cladding regions are separated by about 3 μm.

2. An electrooptic clad waveguide comprising an optical waveguide core defining a primary axis of propagation z, a first cladding region offset from said z axis in a first direction alone an x axis perpendicular to said z axis, and a second cladding region offset from said z axis in a second direction along said x axis, wherein:
    said optical waveguide core comprises a substantially non-electrooptic material defining a refractive index $n_1$;
    said first cladding region comprises an electrooptic polymer defining a refractive index that is less than $n_1$;
    said second cladding region comprises an electrooptic polymer defining a refractive index that is less than $n_1$;
    said first and second cladding regions are poled in opposite directions; and
    said waveguide core defines a cross-sectional x axis width that decreases from a region outside of said first and second cladding regions to a region bounded by said first and second cladding regions.

3. An electrooptic clad waveguide comprising an optical waveguide core defining a primary axis of propagation z, a first cladding region offset from said z axis in a first direction along an x axis perpendicular to said z axis, and a second cladding region offset from said z axis in a second direction alone said x axis, wherein:
    said optical waveguide core comprises a substantially non-electrooptic material defining a refractive index $n_1$;
    said first cladding region comprises an electronic polymer defining a refractive index that is less than $n_1$;
    said second cladding region comprises an electrooptic polymer defining a refractive index that is less than $n_1$;
    said first and second cladding regions are poled in opposite directions; and
    said optical waveguide core comprises a doped silica waveguide and said refractive index $n_1$ is about 1.45 at 1550 nm.

4. An electrooptic clad waveguide comprising an optical waveguide core defining a primary axis of propagation z, a first cladding region offset from said z axis in a first direction along an x axis perpendicular to said z axis, and a second cladding region offset from said z axis in a second direction along said x axis, wherein:
    said optical waveguide core comprises a substantially now-electrooptic material defining a refractive index $n_1$;
    said first cladding region comprises an electrooptic polymer defining a refractive index that is less than $n_1$;
    said second cladding region comprises an electrooptic polymer defining a refractive index that is less than $n_1$;

said first and second cladding regions are poled in opposite directions; and said first and second cladding regions comprise a common electrooptic polymer.

5. An electrooptic clad waveguide comprising an optical waveguide core defining a primary axis of propagation z, a first cladding region offset from said z axis in a first direction alone an x axis perpendicular to said z axis, and a second cladding region offset from said z axis in a second direction along said x axis, wherein:

said optical waveguide core comprises a substantially non-electrooptic material defining a refractive index $n_1$;

said first cladding region comprises an electrooptic polymer defining a refractive index that is less than $n_1$;

said second cladding region comprises an electrooptic polymer defining a refractive index that is less than $n_1$;

said first and second cladding regions are poled in Opposite directions; and the refractive index of the first cladding region is equal to the refractive index of the second cladding region.

6. An electrooptic clad waveguide comprising an optical waveguide core defining a primary axis of propagation z, a first cladding region offset from said z axis in a first direction along an x axis perpendicular to said z axis, and a second cladding region offset from said z axis in a second direction along said x axis, wherein:

said optical waveguide core comprises a substantially non-electrooptic material defining a refractive index $n_1$;

said first cladding region comprises an electrooptic polymer defining a refractive index that is less than $n_1$;

said second cladding region comprises an electrooptic polymer defining a refractive index that is less than $n_1$; and said first arid second cladding regions are poled in perpendicular directions.

7. A waveguide as claimed in claim 6 further comprising a set of control electrodes arranged to create an electric field in said first and second cladding regions.

8. A waveguide as claimed in claim 6 wherein said set of control electrodes are arranged to create an electric field in said first cladding region that is substantially perpendicular to an electric field created in said second cladding region.

9. A waveguide as claimed in claim 8 wherein said control electrodes are arranged such that a quantitative combination of said electric field and said poling in said first cladding region is substantially equivalent to a quantitative combination of said electric field and said poling in said second cladding region.

10. An electrooptic clad waveguide comprising an optical waveguide core defining a primary axis of propagation z, a first cladding region offset from said z axis in a first direction along an x axis perpendicular to said z axis, a second cladding region offset from said z axis in a second direction along said x axis, and first and second control electrodes, wherein:

said optical waveguide core comprises a substantially non-electrooptic material defining a refractive index $n_1$;

said first cladding region comprises an electrooptic polymer defining a refractive index that is less than $n_1$;

said second cladding region comprises an electrooptic polymer defining a refractive index that is less than $n_1$;

said first and second control electrodes are arranged to enable electrooptic modification of said refractive indices of said first and second cladding regions by creating a contoured electric field in said first and second cladding regions;

said contoured electric field and said respective directions of polarization in said first and second cladding regions define a polarization-independent waveguide structure along said primary axis of propagation of said electrooptic clad waveguide;

said first and second cladding regions are poled along substantially the same contour of said electric field; and said contoured electric field is defined by substantially equivalent x and y components in an x-y plane defined by said x and y axes.

11. An electrooptic clad waveguide comprising an optical waveguide core defining a primary axis of propagation z, a first cladding region offset from said z axis in a first direction along an x axis perpendicular to said z axis, a second cladding region offset from said z axis in a second direction along said x axis, and first and second control electrodes, wherein:

said optical waveguide core comprises a substantially non-electrooptic material defining a refractive index $n_1$;

said first cladding region comprises an electrooptic polymer defining a refractive index that is less than $n_1$;

said second cladding region comprises an electrooptic polymer defining a refractive index that is less than $n_1$;

said first and second control electrodes are arranged to enable electrooptic modification of said refractive indices of said first and second cladding regions by creating a contoured electric field in said first and second cladding regions;

said contoured electric field and said respective directions of polarization in said first and second cladding regions define a Polarization-independent waveguide structure along said primary axis of propagation of said electrooptic clad waveguide;

said first and second cladding regions are poled along substantially the same contour of said electric field;

said contoured electric field is defined by x and y components in an x-y plane defined by said x and y axes; and said contoured electric field is established such that said x and y components in each of said cladding regions define substantially equivalent phase control of respective TE and TM modes of propagation of an optical signal propagating along said primary axis of propagation z.

12. An electrooptic clad waveguide comprising an optical waveguide core defining a primary axis of propagation z, a first cladding region offset from said z axis in a first direction along an x axis perpendicular to said z axis, a second cladding region offset from said z axis in a second direction along said x axis, and first and second control electrodes, wherein:

said optical waveguide core comprises a substantially non-electrooptic material defining a refractive index $n_1$;

said first cladding region comprises an electrooptic polymer defining a refractive index that is less than $n_1$;

said second cladding region comprises an electrooptic polymer defining a refractive index that is less than $n_1$;

said first and second control electrodes are arranged to enable electrooptic modification of said refractive indices of said first and second cladding regions by creating a contoured electric field in said first and second cladding regions;

said contoured electric field and said respective directions of polarization in said first and second cladding regions define a polarization-independent waveguide structure along said primary axis of propagation of said electrooptic clad waveguide;

said first and second cladding regions are poled along substantially same contour of said electric field;

an optical signal having respective TIE and TM modes of propagation may pass along said primary axis of propagation z; and said arrangement of said first and second control electrodes and said polarization of said first and second cladding regions enable substantially equivalent phase modification of said TE and TM modes of said optical signal.

13. An electrooptic clad waveguide comprising an optical waveguide core defining a primary axis of propagation z, a first cladding region offset from said z axis in a first direction along an x axis perpendicular to said z axis, a second cladding region offset from said z axis in a second direction along said x axis, and first and second control electrodes, wherein:

said optical waveguide core comprises a substantially non-electrooptic material defining a refractive index $n_1$;

said first cladding region comprises an electrooptic polymer defining a refractive index that is less than $n_1$;

said second cladding region comprises an electrooptic polymer defining a refractive index that is less than $n_1$;

said first and second control electrodes are arranged to enable electrooptic modification of said refractive indices of said first and second cladding regions by creating a contoured electric field in said first and second cladding regions;

said contoured electric field and said respective directions of polarization in said first and second cladding regions define a polarization-independent waveguide structure alone said primary axis of propagation of said electrooptic clad waveguide;

said first and second cladding regions are poled along substantially the same contour of said electric field; and said first and second control electrodes cooperate with a dielectric constant medium to create said contoured electric field in said first and second cladding regions.

14. A waveguide as claimed in claim 13 wherein said first and second cladding regions are at least partially disposed between said first and second control electrodes and said dielectric constant medium.

15. A waveguide as claimed in claim 13 wherein said first and second control electrodes are disposed on a first surface of said electrooptic clad waveguide and said dielectric constant medium is disposed on a second surface of said electrooptic clad waveguide opposite said first surface.

16. An integrated optical device comprising an optical input, an optical output, an electrooptic clad waveguide, and first and second control electrodes, wherein:

said electrooptic clad waveguide is arranged along an optical path defined between said optical input and said optical output;

said electrooptic clad waveguide is characterized by an optical phase delay $\phi=2\pi L n_{eff}/\lambda$, where $n_{eff}$ is the effective index of refraction of said waveguide. L is the length over which the phase delay occurs, and $\lambda$ is the wavelength of light propagating along said optical path;

said electrooptic clad waveguide comprises an optical waveguide core defining a primary axis of propagation z, a first cladding region offset from said z axis in a first direction along an x axis perpendicular to said z axis, and a second cladding region offset from said z axis in a second direction along said x axis;

said optical waveguide core comprises a substantially non-electrooptic material defining a refractive index $n_1$;

said first cladding region comprises an electrooptic polymer defining a refractive index that is less than $n_1$;

said second cladding region comprises an electrooptic polymer defining a refractive index that is less than $n_1$;

said waveguide core defines a cross-sectional x axis width that decreases from a region outside of said first and second cladding regions to a region bounded by said first and second cladding regions; and said first and second control electrodes are ax-ranged to create an electric field in said first and second cladding regions capable of changing said refractive indices of said first and second electrooptic cladding regions without a corresponding change in said refractive index $n_1$ of said waveguide core so as to induce a core-independent change in $n_{eff}$ and a corresponding change in said optical phase delay $\phi$ of said waveguide.

17. An integrated optical device as claimed in claim 16 wherein said cross-sectional x-axis decreases in width by about 60%.

18. An integrated optical device as claimed in claim 16 wherein said cross-sectional x-axis decreases in width by at least about 40%.

19. An integrated optical device as claimed in claim 16 wherein said cross-sectional x axis decreases in width to about 3$\mu$m in said region bounded by said first and second cladding regions.

20. An integrated optical device as claimed in claim 16 wherein said cross-sectional x axis decreases in width from about 8$\mu$m in said region outside of said first and second cladding regions to about 3$\mu$m in said region bounded by said first and second cladding regions.

21. An integrated optical device as claimed in claim 16 wherein said cross-sectional x axis decreases in width from about 5 $\mu$m in said region outside of said first and second cladding regions to about 3 $\mu$m in said region bounded by said first and second cladding regions.

22. An integrated optical device as claimed in claim 16 wherein said first and second cladding regions are poled in opposite directions.

23. An integrated optical device as claimed in claim 16 wherein said first and second cladding regions are poled in perpendicular directions.

24. An integrated optical device as claimed in claim 16 wherein said first and second cladding regions are poled in substantially the same direction.

25. An integrated optical device as claimed in claim 16 wherein said optical waveguide core comprises a silica waveguide and said refractive index $n_1$ is about 1.45 at 1550 nm.

26. An integrated optical device comprising first and second waveguides arranged to define a Mach-Zehnder interferometer including first and second directional coupling regions, an intermediate coupling region disposed between said first and second directional coupling regions, a set of control electrodes, an optical input, and at least one optical output, wherein:

at least one of said first and second waveguides comprises an electrooptic clad waveguide comprising a substantially non-electrooptic optical waveguide core defining a refractive index $n_1$;

said waveguide core of said electrooptic clad waveguide is disposed between first and second cladding regions in said intermediate coupling region;

said first cladding region comprises a poled electrooptic polymer defining a refractive index that is less than $n_1$;

said second cladding region comprises a poled electrooptic polymer defining a refractive index that is less than $n_1$;

said control electrodes are arranged to create an electric field in said first and second cladding regions capable of changing said refractive indices of said first and second electrooptic cladding regions so as to induce a change in an effective index of refraction $n_{\it eff}$ of said electrooptic clad waveguide; and said control electrodes are arranged such that a quantitative combination of said electric field and said poling in said first cladding region is substantially equivalent to a quantitative combination of said electric field and said poling in said second cladding region, whereby an output intensity $I_{out}$ at one of said optical outputs is related to an input intensity $I_{in}$ according to one of the following equations $$|I_{out}|^2 = |I_{in}|^2 \sin^2\left(\frac{\phi}{2}\right)$$

$$|I_{out}|^2 = |I_{in}|^2 \cos^2\left(\frac{\phi}{2}\right)$$

where $\phi$ represents optical phase delay resulting from said change in said effective index of refraction $n_{\it eff}$ of said electrooptic clad waveguide.

27. An integrated optical device as claimed in claim 26 wherein said first and second cladding regions are poled in opposite directions.

28. An integrated optical device as claimed in claim 26 wherein said first and second cladding regions are poled in perpendicular directions.

29. An integrated optical device as claimed in claim 26 wherein said first and second cladding regions are poled in substantially the same direction.

30. An integrated optical device as claimed in claim 26 wherein said waveguide core defines a cross-sectional x axis width that decreases from a region outside of said first and second cladding regions to a region bounded by said first and second cladding regions.

31. An integrated optical device as claimed in claim 26 wherein said optical waveguide core comprises a silica waveguide and said refractive index $n_1$ is about 1.45 at 1550 nm.

32. An integrated optical device comprising first and second electrooptic clad waveguides arranged to define a Mach-Zehnder interferometer including first and second directional coupling regions, an intermediate coupling region disposed between said first and second directional coupling regions, a set of control electrodes, first and second optical inputs, and first and second optical outputs, wherein:

said first electrooptic clad waveguide comprises a substantially non-electrooptic optical waveguide core defining a refractive index $n_1$;

said waveguide core of said first waveguide is disposed between first and second cladding regions of said first waveguide in said intermediate coupling region;

said first cladding region of said first waveguide comprises a poled electrooptic polymer defining a refractive index that is less than $n_1$;

said second cladding region of said first waveguide comprises a poled electrooptic polymer defining a refractive index that is less than $n_1$;

said second electrooptic clad waveguide comprises a substantially non-electrooptic optical waveguide core defining a refractive index $n_1$;

said waveguide core of said second waveguide is disposed between first and second cladding regions of said second waveguide in said intermediate coupling region;

said first cladding region of said second waveguide comprises a poled electrooptic polymer defining a refractive index that is less than $n_1$;

said second cladding region of said second waveguide comprises a poled electrooptic polymer defining a refractive index that is less that $n_1$;

said poling of said first and second cladding regions of said first waveguide is substantially perpendicular to said poling of said first and second cladding regions of said second waveguide; and said control electrodes are arranged to create an electric field in said first and second cladding regions of said first and second waveguides to induce a change in an effective index of refraction $n_{\it eff}$ of said first and second waveguides, whereby input optical signals may be directed selectively to separate ones of said optical outputs by controlling said electric field.

33. An integrated optical device as claimed in claim 32 wherein said poling of said first and second cladding regions of said first and second waveguides and said arrangement of said control electrodes are such that, upon creation of said electric field, TE and TM polarized light propagating along said first and second waveguides are phase modulated to different degrees in each of said waveguides and to substantially equal degrees across both of said waveguides.

34. An integrated optical device as claimed in claim 32 wherein said waveguide core defines a cross-sectional x axis width that decreases from a region outside of said first and second cladding regions to a region bounded by said first and second cladding regions.

35. An integrated optical device as claimed in claim 32 wherein said optical waveguide core comprises a silica waveguide and said refractive index $n_1$ is about 1.45 at 1550 nm.

36. An integrated optical device comprising first and second waveguides arranged to define a Mach-Zehnder interferometer including first and second directional coupling regions, an intermediate coupling region disposed between said first and second directional coupling regions, a set of control electrodes, an optical input, and at least one optical output, wherein:

at least one of said first and second waveguides comprises an electrooptic clad waveguide comprising a substantially non-electrooptic optical waveguide core defining a refractive index $n_1$;

said waveguide core of said electrooptic clad waveguide is disposed between first and second cladding regions in said intermediate coupling region;

said first cladding region comprises a poled electrooptic polymer defining a refractive index that is less than $n_1$;

said second cladding region comprises a poled electrooptic polymer defining a refractive index that is less than $n_1$;

said control electrodes form a traveling wave stripline and are arranged to create an electric field in said first and second cladding regions capable of changing said refractive indices of said first and second electrooptic cladding regions so as to induce a change in an effective index of refraction $n_{\it eff}$ of said electrooptic clad waveguide;

said traveling wave stripline is characterized by a dielectric constant E selected such that an optical signal propagating in said electrooptic clad waveguide propagates at the same velocity as an electrical signal propagating in said traveling wave stripline; and said control electrodes are arranged such that a quantitative combination of said electric field and said poling in said first cladding region is substantially equivalent to a quantitative combination of said electric field and said poling in said second cladding region, whereby an output intensity $I_{out}$ at one of said optical outputs is related to an input intensity $I_{in}$ according to one of the following equations $$|I_{out}|^2 = |I_{in}|^2 \sin^2\left(\frac{\phi}{2}\right)$$

$$|I_{out}|^2 = |I_{in}|^2 \cos^2\left(\frac{\phi}{2}\right)$$

where $\phi$ represents optical phase delay resulting from said change in said effective index of refraction $n_{\it eff}$ of said electrooptic clad waveguide.

37. An integrated optical device as claimed in claim 36 wherein said integrated optical device is configured such that $\in = (n_{\it eff})$, where $\in$ is the dielectric constant of said traveling wave stripline at microwave frequencies and $n_{\it eff}$ is the effective index of refraction of said electrooptic clad waveguide.

38. An integrated optical device as claimed in claim 36 wherein said traveling wave stripline includes a microwave input port and a 50$\in$ termination.

39. An integrated optical device as claimed in claim 36 wherein said waveguide core defines a cross-sectional x axis width that decreases from a region outside of said first and second cladding regions to a region bounded by said first and second cladding regions.

40. An integrated optical device as claimed in claim 36 wherein said optical waveguide core comprises a silica waveguide arid said refractive index $n_1$ is about 1.45 at 1550 nm.

41. An integrated optical device comprising first and second electrooptic clad waveguides of unequal length arranged to define an asymmetric Mach-Zehnder interferometer including first and second directional coupling regions, an intermediate coupling region disposed between said first and second directional coupling regions, a set of control electrodes, an optical input, and first and second optical outputs, wherein:

said first electrooptic clad waveguide comprises a substantially non-electrooptic optical waveguide core defining a refractive index $n_1$;

said waveguide core of said first waveguide is disposed between first and second cladding regions of said first waveguide in said intermediate coupling region;

said first cladding region of said first waveguide comprises a poled electrooptic polymer defining a refractive index that is less than $n_1$;

said second cladding region of said first waveguide comprises a poled electrooptic polymer defining a refractive index that is less than $n_1$;

said second electrooptic clad waveguide comprises a substantially non-electrooptic optical waveguide core defining a refractive index $n_1$;

said waveguide core of said second waveguide is disposed between first and second cladding regions of said second waveguide in said intermediate coupling region;

said first cladding region of said second waveguide comprises a poled electrooptic polymer defining a refractive index that is less than $n_1$;

said second cladding region of said second waveguide comprises a poled electrooptic polymer defining a refractive index that is less than $n_1$;

said poling of said first and second cladding regions of said first waveguide is substantially perpendicular to said poling of said first and second cladding regions of said second waveguide; and said control electrodes are arranged to create an electric field in said first and second cladding regions of said first and second waveguides to induce a change in an effective index of refraction $n_{\it eff}$ of said first and second waveguides, whereby first and second wavelength components of an input optical signal may be directed selectively to separate ones of said optical outputs by controlling said electric field.

42. An integrated optical device as claimed in claim 41 wherein said poling of said first and second cladding regions of said first and second waveguides and said arrangement of said control electrodes are such that, upon creation of said electric field, TE and TM polarized light propagating along said first and second waveguides are phase modulated to different degrees in each of said waveguides and to substantially equal degrees across both of said waveguides.

43. An integrated optical device as claimed in claim 41 wherein said waveguide core defines a cross-sectional x axis width that decreases from a region outside of said first and second cladding regions to a region bounded by said first and second cladding regions.

44. An integrated optical device as claimed in claim 41 wherein said optical waveguide core comprises a silica waveguide and said refractive index $n_1$ is about 1.45 at 1550 nm.

45. An integrated optical device comprising first and second electrooptic clad waveguides arranged to define a directional coupling region., a set of control electrodes, first and second optical inputs, and first and second optical outputs, wherein:

said first electrooptic clad waveguide comprises a substantially non-electrooptic optical waveguide core defining a refractive index $n_1$;

said waveguide core of said first waveguide is disposed between a first outer electrooptic cladding region and an electrooptic gap region in said directional coupling region;

said first outer cladding region comprises a paled electrooptic polymer defining a refractive index that is less than $n_1$;

said electrooptic gap region comprises a poled electrooptic polymer defining a refractive index that is less than $n_1$;

said second electrooptic clad waveguide comprises a substantially non-electrooptic optical waveguide core defining a refractive index $n_1$;

said waveguide core of said second waveguide is disposed between a second outer electrooptic cladding region and said electrooptic gap region in said directional coupling region, said second outer cladding region comprises a poled electrooptic polymer defining a refractive index that is less than $n_1$;

said control electrodes are arranged to create an electric field across said outer cladding regions and said electrooptic gap region, whereby an optical signal incident in one of said waveguides may be switched to the other of said waveguides; and said outer cladding regions are poled perpendicular to said electrooptic gap region.

46. An integrated optical device as claimed in claim 45 wherein:

said control electrodes are arranged to enable electrooptic modification of said refractive indices of said first and second cladding regions by creating a contoured electric field in said outer cladding regions and said electrooptic gap region;

said contoured electric field and said respective directions of polarization in said outer cladding regions and said electrooptic gap region define a polarization-independent waveguide structure along a primary axis of propagation of said first and second electrooptic clad waveguides; and said first and second cladding regions are poled along substantially the same contour of said electric field.

47. An integrated optical device as claimed in claim 46 wherein said contoured electric field is substantially symmetric relative to said electrooptic gap region.

48. An integrated optical device as claimed in claim 46 wherein said control electrodes cooperate with a dielectric constant medium to create said contoured electric field.

49. An integrated optical device as claimed in claim 48 wherein said first and second cladding regions are at least partially disposed between said control electrodes and said dielectric constant medium.

50. An optical waveguide comprising an optical input, an optical Output, and a waveguide core, wherein:

said waveguide core defines a core height dimension h that remains substantially constant between said optical input and said optical output;

said core width dimension defines an input width $w_1$ at said optical input, an output width $w_2$ at said optical output, an increased-width $w_0$ alone a phase compensating element of said waveguide core, and a decreased-width $w_3$ along a thinned-down portion of said waveguide core;

said increased-width $w_0$ is greater than said input width:

said decreased-width $w_3$ is less than said input width:

said thinned-down portion introduces a first phase shift in an optical signal propagating from said optical input to said optical output;

said phase compensating element introduces a second phase shift in said optical signal; and said first phase shift is substantially equal and opposite in magnitude to said second phase shift.

51. An optical waveguide comprising an optical input, an optical output, and a waveguide core, wherein:

said waveguide core defines a core height dimension h that remains substantially constant between said optical input and said optical output;

said core width dimension defines an increased-width $w_0$ along a phase compensating element of said waveguide core, and a decreased-width $w_3$ along a thinned-down portion of said waveguide core;

said decreased-width $w_3$ is less than said core height dimension h; and said increased-width $w_0$ is greater than said core height dimension L.

52. An integrated optical device comprising an optical input, an optical output, and an optically functional clad waveguide, wherein:

said optically functional clad waveguide is arranged along an optical path defined between said optical input and said optical output;

said optically functional clad waveguide is characterized by an optical phase delay $\phi=2\pi L n_{eff}/\lambda$, where $n_{eff}$ is the effective index of refraction of said waveguide, L is the length over which the phase delay occurs, and $\lambda$ is the wavelength of light propagating along said optical path;

said optically functional clad waveguide comprises an optical waveguide core defining a primary axis of propagation z, a first cladding region offset from said z axis in a first direction along an x axis perpendicular to said z axis, and a second cladding region offset from said z axis in a second direction along said x axis;

said optical waveguide core comprises an optically non-functional material defining a refractive index $n_1$;

said first cladding region defines a refractive index that is less than $n_1$;

said second cladding region defines a refractive index that is less than $n_1$;

said waveguide core defines a cross-sectional x axis width that decreases from a region outside of said first and second cladding regions to a region bounded by said first and second cladding regions; and said refractive indices of said first and second cladding regions are arranged to change in response to a control parameter without a corresponding change in said refractive index $n_1$ of said waveguide core so as to induce a core-independent change in $n_{eff}$ and a corresponding change in said optical phase delay $\phi$ of said waveguide.

53. An integrated optical device comprising first and second waveguides arranged to define a Mach-Zehnder interferometer including first and second directional coupling regions, an intermediate coupling region disposed between said first and second directional coupling regions, a set of control electrodes, an optical input, and at least one optical output, wherein:

at least one of said first and second waveguides comprises an optically functional electrooptic clad waveguide comprising an optically non-functional optical waveguide core defining a refractive index $n_1$;

said waveguide core of said clad waveguide is disposed between first and second cladding regions in said intermediate coupling region;

said first cladding region comprises a poled material defining a refractive index that is less than $n_1$;

said second cladding region comprises a poled material defining a refractive index that is less than $n_1$;

said control electrodes are arranged to create an electric field in said first and second cladding regions capable of changing said refractive indices of said first and second cladding regions so as to induce a change in an effective index of refraction $n_{eff}$ of said waveguide; and said control electrodes are arranged such that a quantitative combination of said electric field and said poling in said first cladding region is substantially equivalent to a quantitative combination of said electric field and said poling in said second cladding region, whereby an output intensity $I_{out}$ at one of said optical outputs is related to an input intensity $I_{in}$ according to one of the following equations $$|I_{out}|^2 = |I_{in}|^2 \sin^2\left(\frac{\phi}{2}\right)$$

$$|I_{out}|^2 = |I_{in}|^2 \cos^2\left(\frac{\phi}{2}\right)$$

where $\phi$ represents optical phase delay resulting from said change in said effective index of refraction $n_{eff}$ of said waveguide.

54. An integrated optical device comprising a plurality of channel waveguides and a thermo/electric poling arrangement, wherein:

at least a pair of said waveguides are at least partially bounded along a portion of their length by respective electrooptic cladding regions defining respective polar axes;

said thermo/electric poling arrangement is provided proximate said respective electrooptic cladding regions and is arranged to orient independently said respective polar axes of said cladding regions.

55. An integrated optical device as claimed in claim 54 wherein selected waveguides are connected via respective waveguide branches.

56. An integrated optical device as claimed in claim 54 wherein selected waveguides are connected via respective evanescent coupling regions.

57. An integrated optical device as claimed in claim 54 wherein said channel waveguides comprise an optically non-functional waveguide core.

58. An integrated optical device as claimed in claim 54 wherein:

said thermo/electric poling arrangement is characterized by a selected processing temperature; and said channel waveguides comprise a ferroelectric material having a Curie temperature greater than said processing temperature of said thermo/electric poling arrangement.

59. An integrated optical device comprising a plurality of channel waveguides and a thermo/electric poling arrangement, wherein:

at least a pair of said waveguides is at least partially bounded along a portion of their length by respective optically functional cladding regions defining respective polar axes;

said thermo/electric poling arrangement is provided proximate said respective optically functional cladding regions and is arranged to orient independently said respective polar axes of said cladding regions.

60. An integrated optical device comprising first and second waveguides arranged to define a Mach-Zehnder interferometer including first and second directional coupling regions, an intermediate coupling region disposed between said first and second directional coupling regions, a set of control electrodes, an optical input, and at least one optical output, wherein:

said first waveguide comprises an electrooptic clad waveguide comprising a substantially non-electrooptic optical waveguide core defining a refractive index $n_1$;

said waveguide core of said first waveguide is disposed between first and second cladding regions in said intermediate coupling region;

said first cladding region of said first waveguide comprises a poled electrooptic polymer defining a refractive index that is less than $n_1$;

said second cladding region of said first waveguide comprises a poled electrooptic polymer defining a refractive index that is less than $n_1$;

said control electrodes are arranged to create an electric field capable of changing said refractive indices of said first and second electrooptic cladding regions of said first waveguide;

said second waveguide comprises an electrooptic clad waveguide comprising a substantially non-electrooptic optical waveguide core defining a refractive index $n_1$;

said waveguide core of said second waveguide is disposed between first and second cladding regions in said intermediate coupling region;

said first cladding region of said second waveguide comprises a poled electrooptic polymer defining a refractive index that is less than $n_1$;

said second cladding region of said second waveguide comprises a poled electrooptic polymer defining a refractive index that is less than $n_1$;

said control electrodes are arranged to create an electric field capable of changing said refractive indices of said first and second electrooptic cladding regions of said second waveguide; and a poling of said first and second cladding regions of said first waveguide is substantially perpendicular to a poling of said first and second cladding regions of said second waveguide such that each waveguide is configured to modulate a selected polarization more than another.

* * * * *

UNITED STATES PATENT AND TRADEMARK OFFICE
CERTIFICATE OF CORRECTION

PATENT NO.      : 6,687,425 B2
DATED           : February 3, 2004
INVENTOR(S)     : Ridgway et al.

It is certified that error appears in the above-identified patent and that said Letters Patent is hereby corrected as shown below:

Column 16,
Line 22, "alone an" should read -- along an --;
Line 42, "alone said" should read -- along said --;
Line 45, "an electronic" should read -- an electrooptic --;
Line 62, "now-electrooptic" should read -- non-electrooptic --;

Column 17,
Line 8, "alone an" should read -- along an --;
Lines 17-18, "in Opposite" should read -- in opposite --;
Line 34, "first arid" should read -- first and --;

Column 19,
Line 5, "TIE" should read -- TE --;
Line 34, "alone said" should read -- along said --;
Line 59, "waveguide. $L$" should read -- waveguide $L$ --;

Column 20,
Line 11, "ax-ranged to" should read -- are arranged --;

Column 22,
Line 67, "E" should read -- $\varepsilon$ --;

Column 23,

Line 24, "$\varepsilon = (n_{\mathit{eff}})$" should read -- $\varepsilon = (n_{\mathit{eff}})^2$ --;

Line 30, "50€" should read -- 50$\Omega$ --;
Line 38, "arid said" should read -- and said --.

UNITED STATES PATENT AND TRADEMARK OFFICE
CERTIFICATE OF CORRECTION

PATENT NO. : 6,687,425 B2
DATED : February 3, 2004
INVENTOR(S) : Ridgway et al.

It is certified that error appears in the above-identified patent and that said Letters Patent is hereby corrected as shown below:

Column 24,
Line 39, "region.," should read -- region, --;
Line 49, "a paled" should read -- a poled --;
Line 62, "region," should read -- region; --;

Column 25,
Line 32, "Output," should read -- output, --;
Lines 42 and 43, "width:" should read -- width; --;
Line 64, "dimension L." should read -- dimension $h$. --.

Signed and Sealed this

Seventeenth Day of August, 2004

JON W. DUDAS
*Acting Director of the United States Patent and Trademark Office*